(12) United States Patent
Kapela

(10) Patent No.: US 11,012,352 B2
(45) Date of Patent: May 18, 2021

(54) TRAFFIC OFFLOADING FOR MOBILE OPERATORS

(71) Applicant: Anton L. Kapela, Denver, CO (US)

(72) Inventor: Anton L. Kapela, Denver, CO (US)

(73) Assignee: EDGEMICRO CORP., Centreville, VA (US)

( * ) Notice: Subject to any disclaimer, the term of this patent is extended or adjusted under 35 U.S.C. 154(b) by 0 days.

(21) Appl. No.: 16/155,401

(22) Filed: Oct. 9, 2018

(65) Prior Publication Data

US 2019/0116118 A1 Apr. 18, 2019

Related U.S. Application Data

(60) Provisional application No. 62/573,023, filed on Oct. 16, 2017.

(51) Int. Cl.
| | |
|---|---|
| *H04L 12/721* | (2013.01) |
| *H04L 12/741* | (2013.01) |
| *H04L 29/12* | (2006.01) |
| *H04L 12/46* | (2006.01) |
| *H04L 29/06* | (2006.01) |
| *H04W 40/32* | (2009.01) |
| *H04W 8/08* | (2009.01) |
| *H04L 12/723* | (2013.01) |

(52) U.S. Cl.
CPC .......... *H04L 45/72* (2013.01); *H04L 12/4633* (2013.01); *H04L 45/74* (2013.01); *H04L 61/256* (2013.01); *H04L 69/22* (2013.01); *H04W 8/082* (2013.01); *H04W 40/32* (2013.01); *H04L 45/50* (2013.01); *H04L 61/2514* (2013.01); *H04L 61/2592* (2013.01); *H04L 2212/00* (2013.01)

(58) Field of Classification Search
CPC ..... H04L 45/72; H04L 45/74; H04L 12/4633; H04L 61/256; H04L 69/22; H04W 8/082; H04W 40/32

See application file for complete search history.

(56) References Cited

U.S. PATENT DOCUMENTS

| | | |
|---|---|---|
| 6,816,460 B1 | 11/2004 | Ahmed et al. |
| 7,929,429 B2 | 4/2011 | Bornstein et al. |
| | (Continued) | |

FOREIGN PATENT DOCUMENTS

CN 106454809 A 2/2017

OTHER PUBLICATIONS

Ben-Othman, J. et al. (2010). "Energy efficient and QoS based routing protocol for wireless sensor networks," *J Parallel Distrib Comput* 70:849-857.

(Continued)

*Primary Examiner* — Ricky Q Ngo
*Assistant Examiner* — Stephen N Steiner
(74) *Attorney, Agent, or Firm* — Mintz Levin Cohn Ferris Glovsky and Popeo, P.C.

(57) ABSTRACT

A method, a system, and a computer program product for data routing in communications systems. A data packet is received and source of the data packet is determined. based on the source of the data packet, a forwarding route for transmission of the data packet is determined. The forwarding route includes at least one of the following: a known content route and a default content route. The data packet is transmitted based on the determined forwarding route.

42 Claims, 24 Drawing Sheets

(56) References Cited

U.S. PATENT DOCUMENTS

| | | | |
|---|---|---|---|
| 8,014,404 | B2 | 9/2011 | Eki et al. |
| 8,411,666 | B1 | 4/2013 | Rogers et al. |
| 8,630,224 | B2 | 1/2014 | Ling et al. |
| 8,787,250 | B2 | 7/2014 | Beser |
| 9,473,385 | B2 | 10/2016 | Hinkle et al. |
| 2012/0281621 | A1* | 11/2012 | Lotfallah ............ H04L 65/1016 370/328 |
| 2013/0188604 | A1* | 7/2013 | Chin .................... H04W 36/08 370/331 |
| 2017/0078186 | A1 | 3/2017 | Thyni et al. |
| 2017/0215122 | A1 | 7/2017 | Nigam et al. |
| 2018/0049062 | A1* | 2/2018 | Sirotkin ............. H04W 36/125 |

OTHER PUBLICATIONS

Chang, C-H. et al. (Sep. 30, 2013). "A Novel LIPA Scheme for LTE VoIP Services with Home eNBs *" located at <http://isyou.info/jowua/papers/jowua-v 4n3-1.pdf> last visited Apr. 23, 2015, 22 pages.

International Search Report dated Jan. 22, 2019, for PCT Application No. PCT/US2018/054999, filed Oct. 9, 2018, 3 pages.

Kundalkar, S. et al:"LIPA:Local IP Access via Home Node B", Radisys White paper, Dec. 31, 2011, located at <http://go.radisys.com/rs/radisys/images/paper-femto-lipa.pdf> last visited Aug. 25, 2016, 11 pages.

Samsung: "Fix LIPA open issues", 3GPP Draft; S2-102386 F, 3rd Generation Partnership Project (3GPP) May 10-14, 2010, 8 pages.

Written Opinion dated Jan. 22, 2019, for PCT Application No. PCT/US2018/054999, filed Oct. 9, 2018, 7 pages.

\* cited by examiner

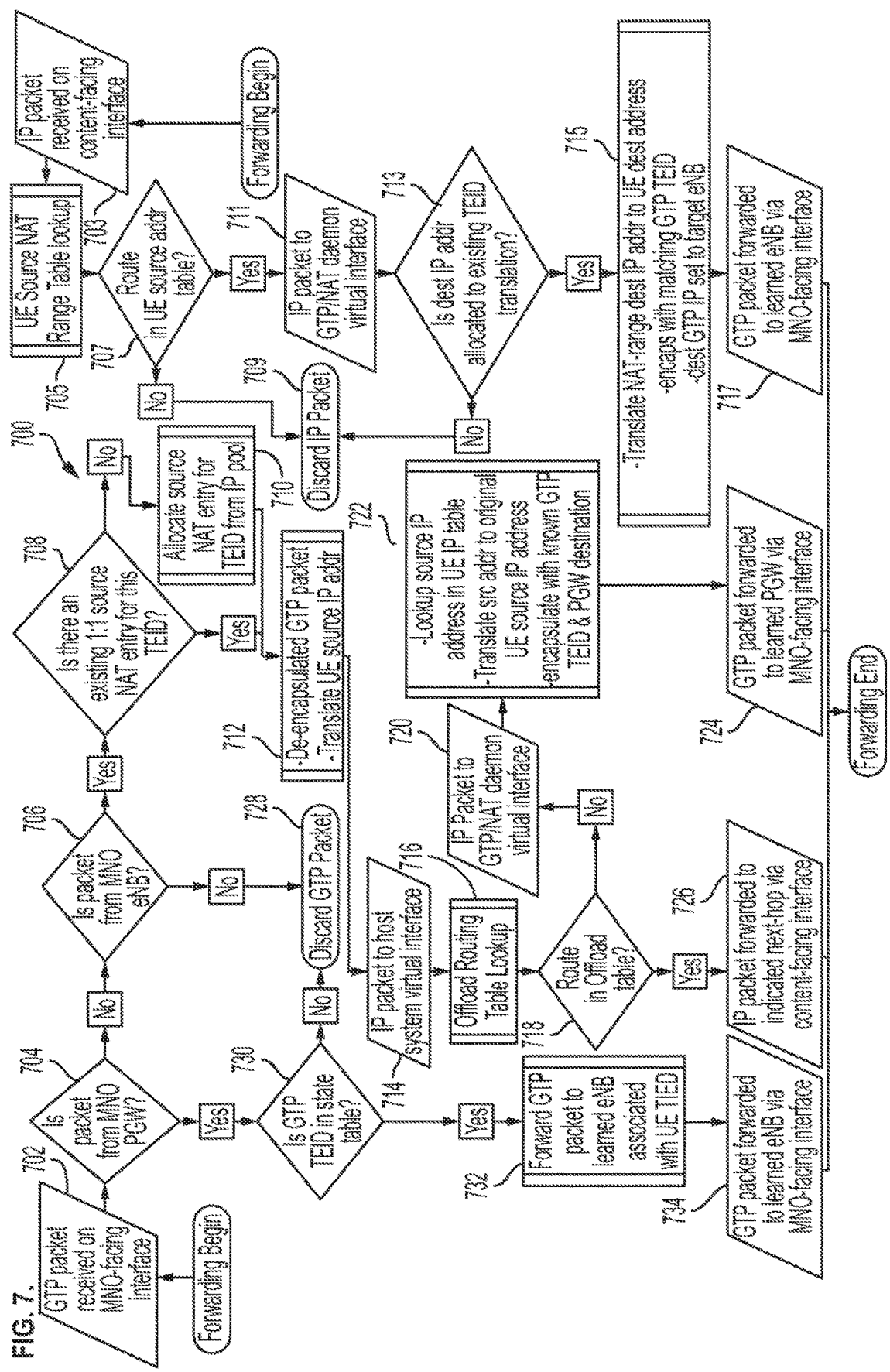

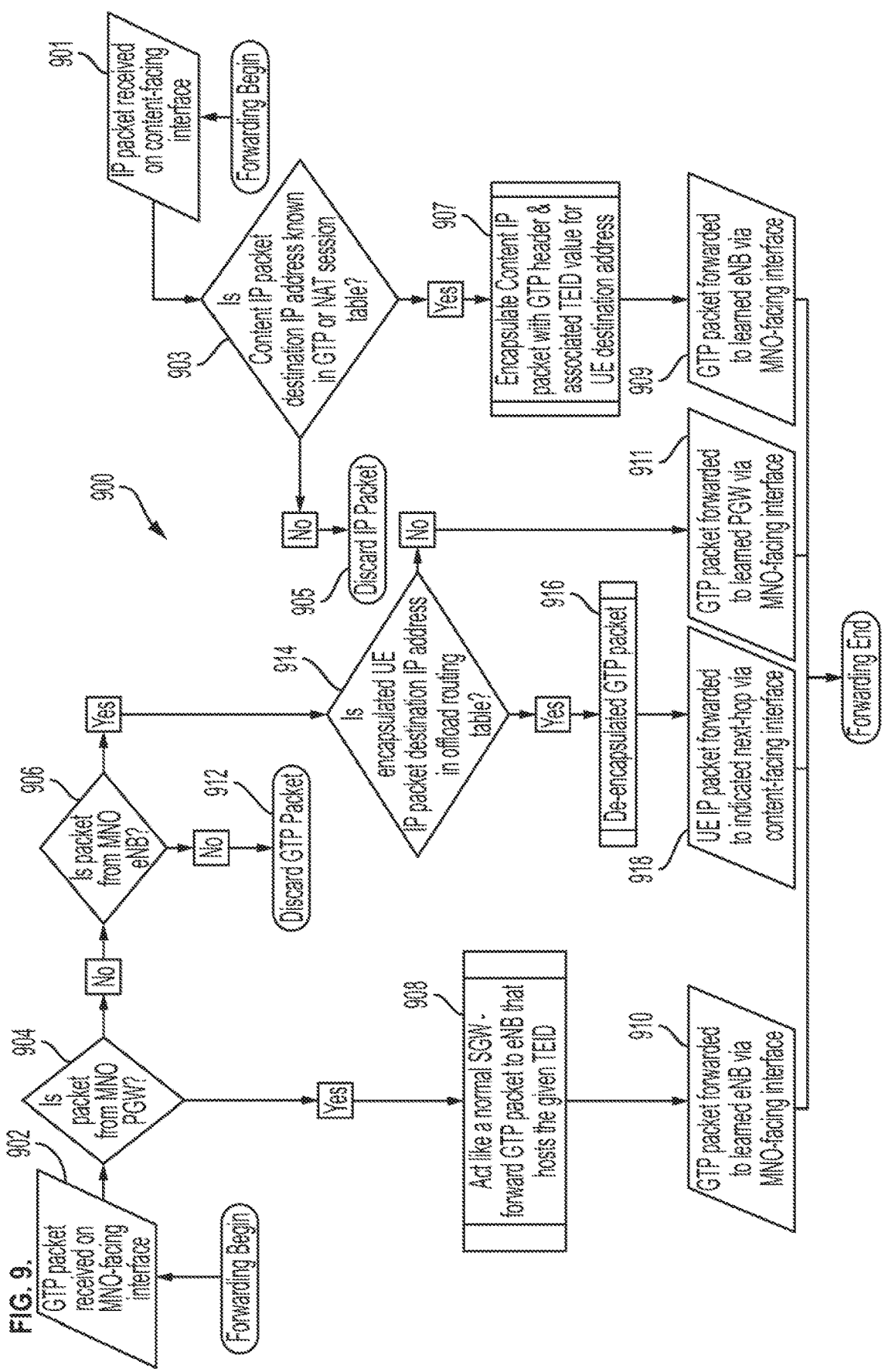

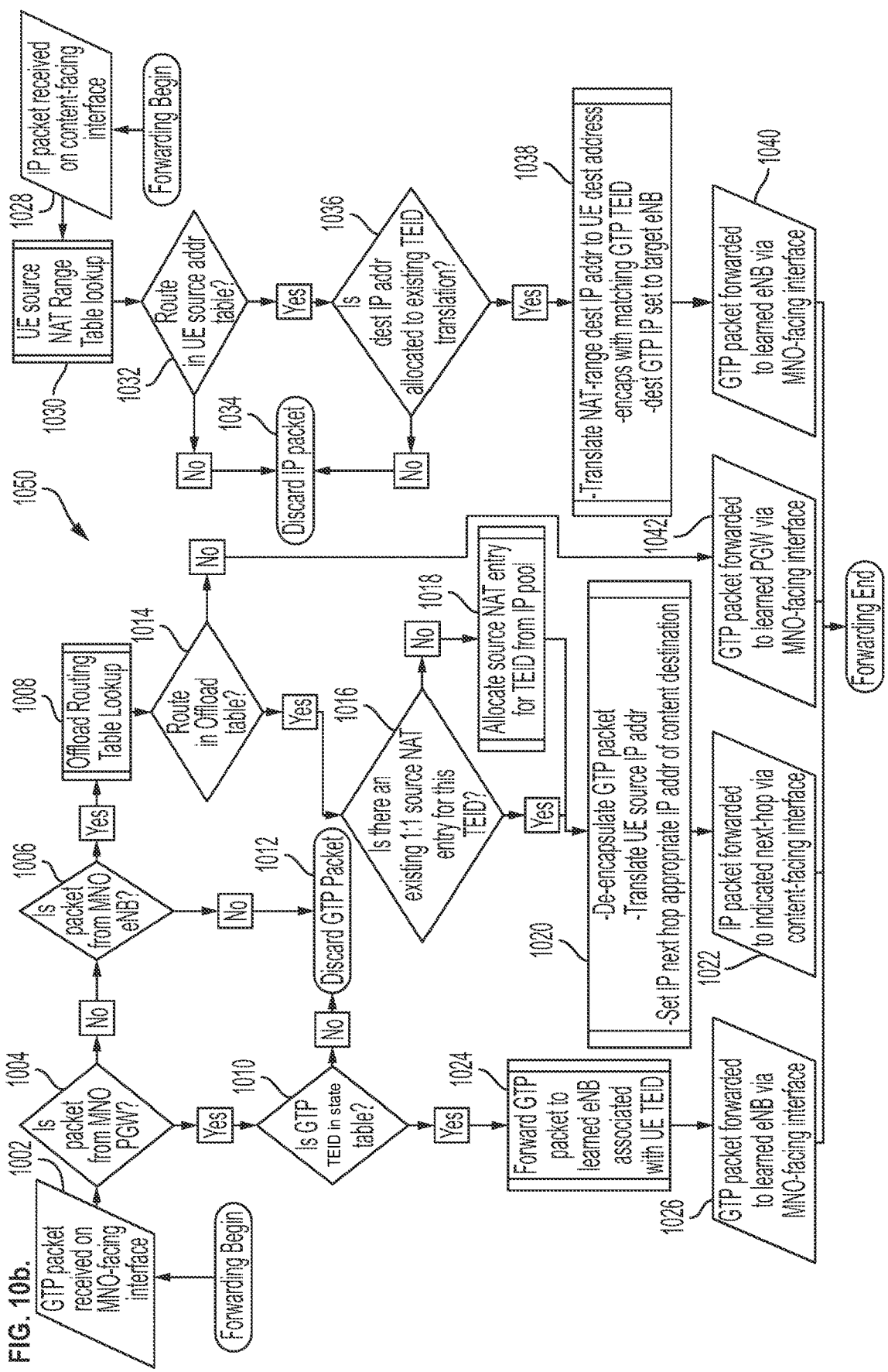

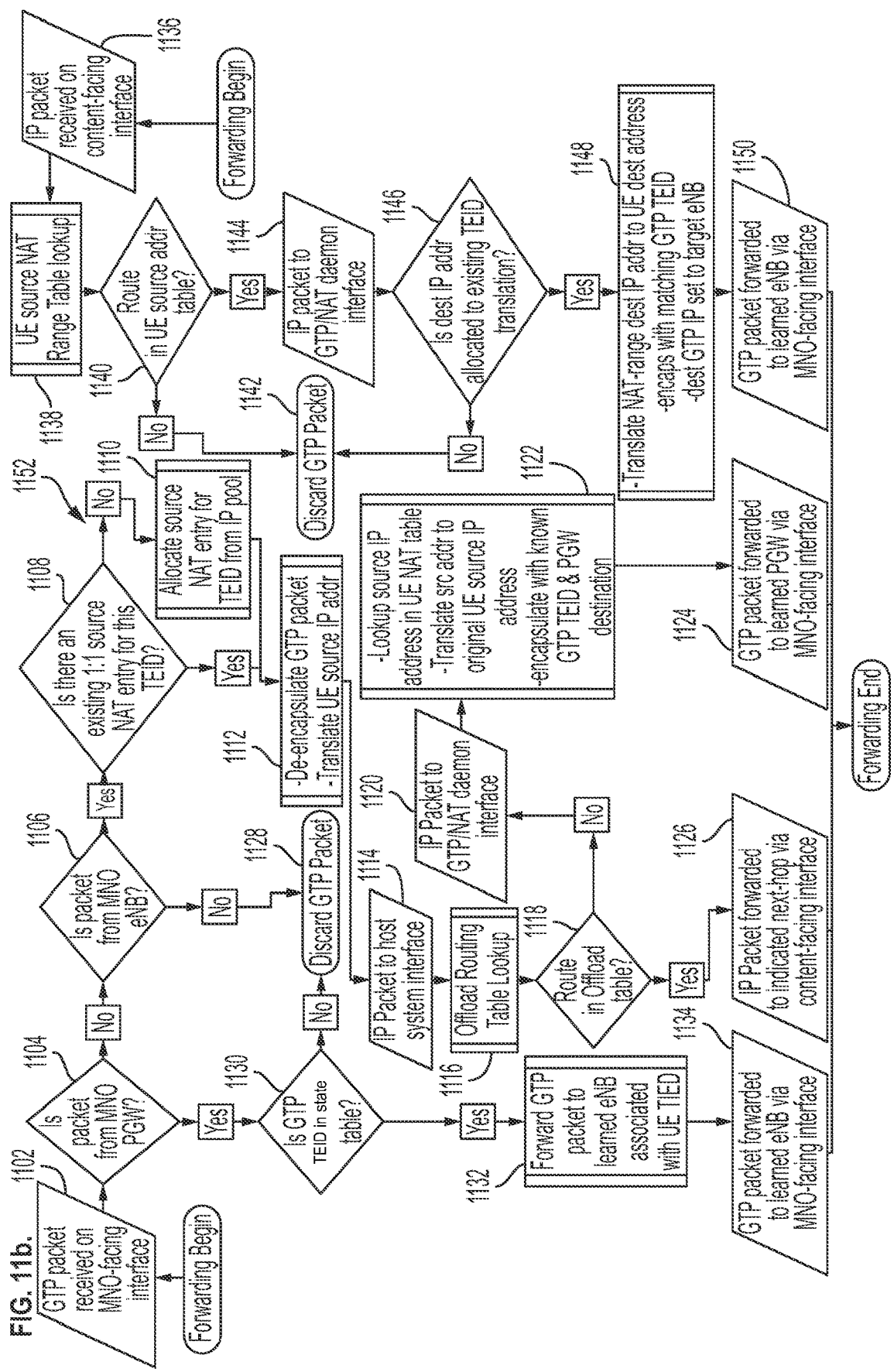

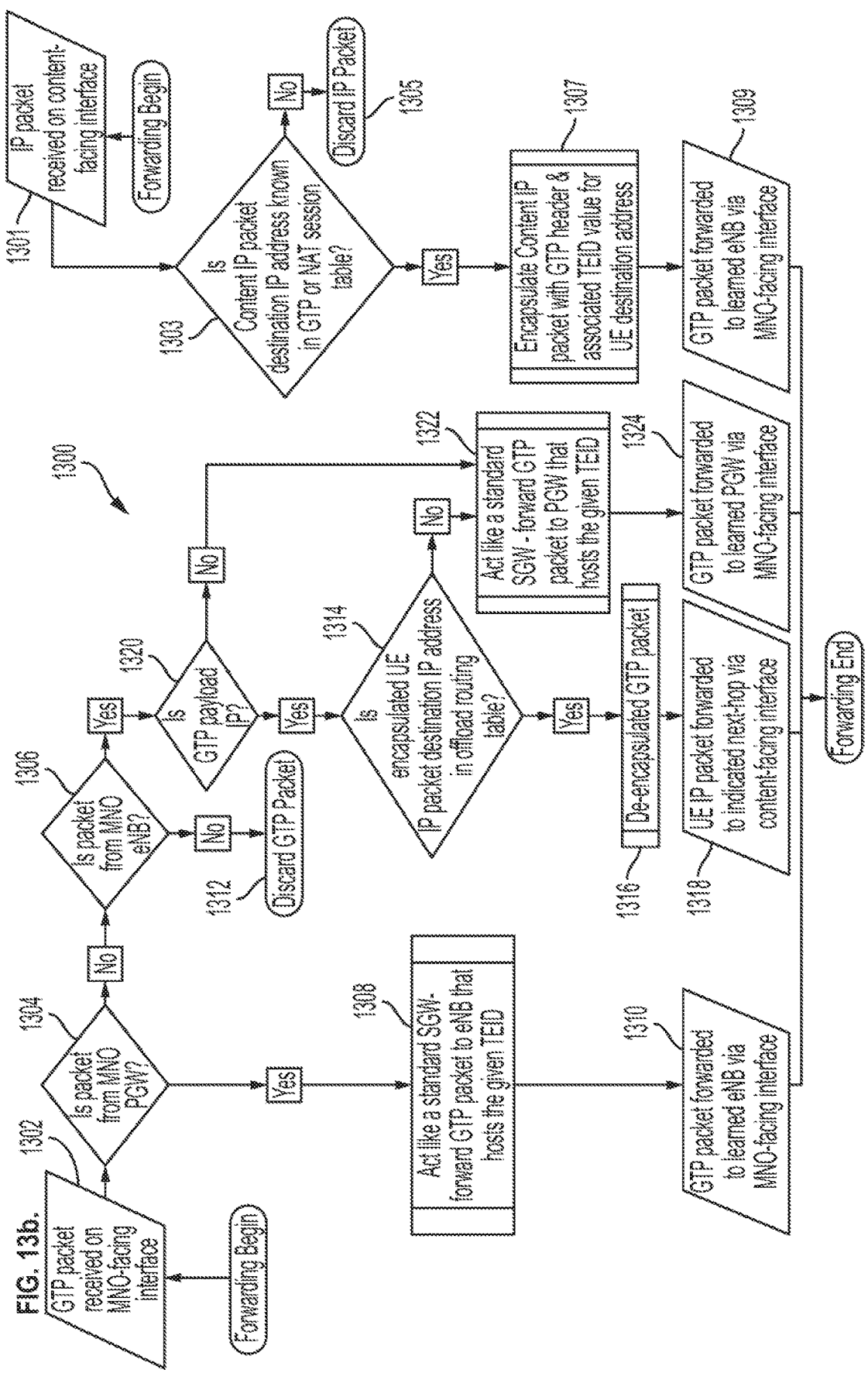

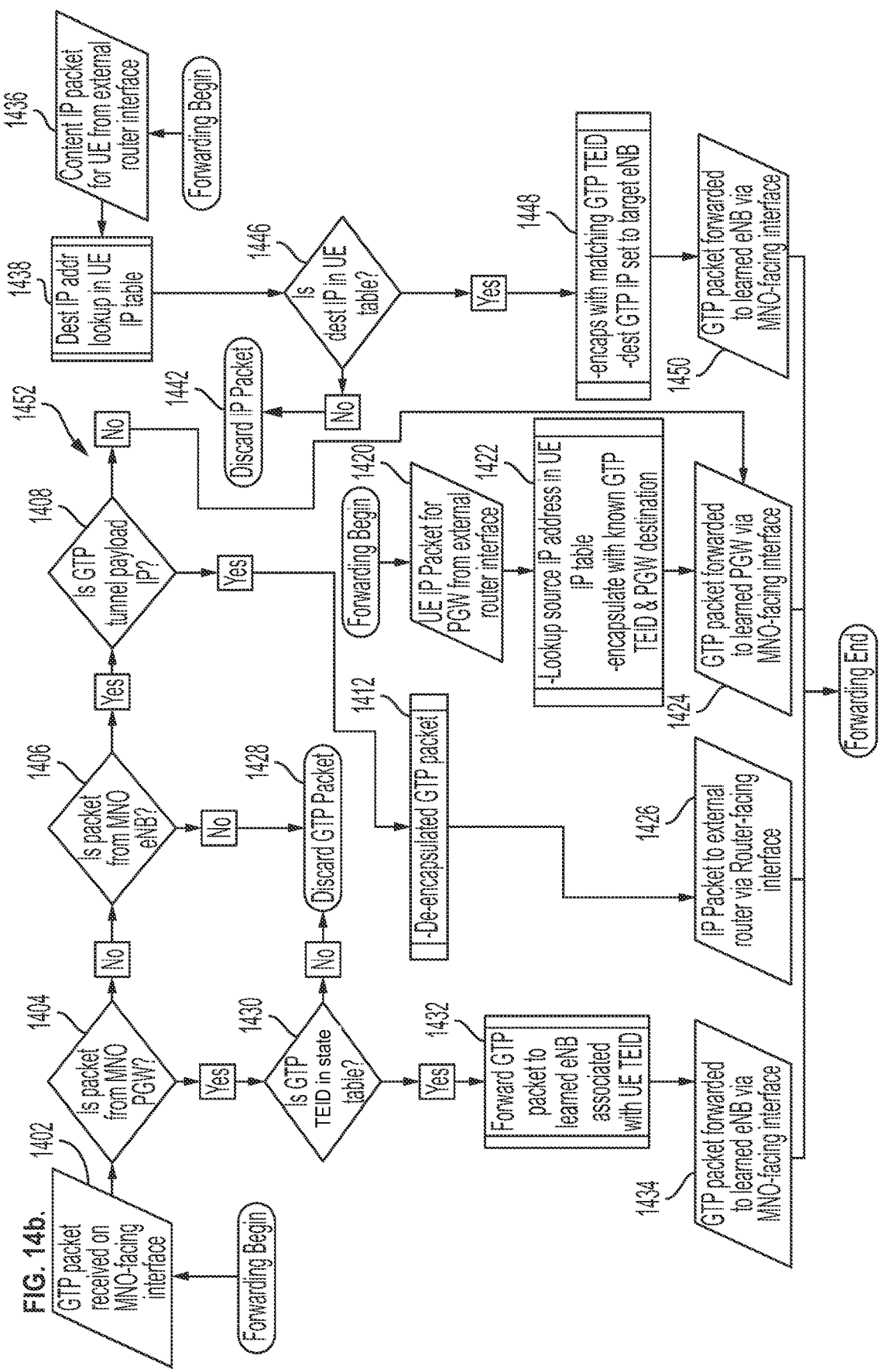

TRAFFIC OFFLOADING FOR MOBILE OPERATORS

CROSS-REFERENCE TO RELATED APPLICATIONS

The present application claims priority to U.S. Provisional Patent Appl. No. 62/573,023 to Kapela, filed Oct. 16, 2017, and entitled "Data Routing In Communications Systems", and incorporates its disclosure herein by reference in its entirety.

TECHNICAL FIELD

The subject matter described herein generally relates to data processing and in particular, to data routing in a communications system, such as a long term (LTE) evolution communication system.

BACKGROUND

Cellular networks provide on-demand communications capabilities to individuals and business entities. A cellular network is wireless network that can be distributed over land areas, which are called cells. Each such cell is served by at least one fixed-location transceiver, i.e., a cell site or a base station. Each cell can use different frequencies than its neighbors to avoid interference and provide guaranteed bandwidth within each cell. When cells are joined together, they provide radio coverage over a wide geographic area enabling mobile telephones, wireless devices, portable transceivers, etc. to communicate with each other and with fixed transceivers and telephones anywhere in the network. Such communications are performed through base stations and are accomplished even if when mobile transceivers are moving through more than one cell during transmission. Major wireless communications providers have deployed cell sites throughout the world to allow mobile phones and mobile computing devices to be connected to the public switched telephone network and Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. Coverage by a cell site can depend on a particular geographical location and/or a number of users that use the network. Various cell sites can be adjacent to each other, whereby a user equipment (e.g., a mobile telephone) that is serviced by one cell site can move to another cell site (e.g., an adjacent cell site), where the new cell site assumes servicing of the user equipment. Also, user equipments (e.g., mobile telephones) located at an edge (e.g., farther from the base station servicing a particular geographical area) of the cell site can experience diminished quality of service (e.g. poor reception, slower receipt/transmission of data, dropped calls, etc.). Poor quality of service can be experienced by users that are closer to the point where cell sites neighbor each other.

Mobile network operators are constantly seeking ways to "offload" data traffic closer to the point of user-network interconnections. It is common for mobile network operators (MNOs) to routinely engage in various forms of network "peering" to reduce commodity IP transit costs, improve network robustness and/or overall availability; however, this typically occurs well upstream of the actual wireless subscribers/user equipments. This implies that even for a "directly peered" content traffic within the confines of a datacenter or other hub site, the carrier must transport all traffic from its core or peering locations to the wireless edge. This can significantly affect effectiveness of data transmissions to the user equipments. Additionally, such transport of traffic greatly increases operational costs associated with base station backhaul. Thus, there is a need for a system and a method for offloading traffic that can provide MNOs with an ability to reduce burden on backhaul and aggregation network elements.

SUMMARY

In some implementations, the current subject matter relates to a computer-implemented method for data routing in communications systems. The method can include receiving a data packet, determining a source of the data packet, determining, based on the source, a forwarding route for transmission of the data packet, wherein the forwarding route includes at least one of the following: a known content route and a default content route, and transmitting the data packet based on the determined forwarding route.

In some implementations, the current subject matter can include one or more of the following optional features. The packet can be received by a local IP access appliance system that can be communicatively coupled to at least one component operated by a mobile network operator (e.g., eNodeB, Ethernet switch(es), backhaul network, evolved packet core (including SGW, PGW, PCRF, MME, etc.) and at least one content provider (e.g., content provider server(s)). The packet received by the local IP access appliance system can include at least one of: an IP packet received from the content provider and a GTP packet received from at least one component operated by the mobile network operator.

If the packet is a GTP packet received from an evolved packet core operated by the mobile network operator, the GTP packet is forwarded to an eNodeB operated by the mobile network operator. If the GTP packet is received from an eNodeB operated by the mobile network operator, at least one encapsulated IP packet (e.g., from a user equipment communicatively coupled to the eNodeB) contained in the GTP packet can be inspected and routed based on the determined encapsulated destination address of the IP packet. The routing includes a determination whether to route the packet along the known content route or the default content route. The GTP packet can be de-encapsulated and a network address translation can be performed if the determined destination address is the known content route, which causes the IP packet to be forwarded to the content provider. Otherwise, if the route is determined to be the default content route, the GTP packet is re-encapsulated and transmitted to the evolved packet core operated by the mobile network operator.

If the packet is an IP packet received from the content provider, the packet is transmitted to a user equipment communicatively coupled to an eNodeB operated by the mobile network operator. The transmission of the packet can performed using a GTP TED, which can be determined by the mobile network operator (i.e., MME of the evolved packet core operated by the mobile network operator).

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the system shown in FIG. 1a;

FIG. 7 illustrates an exemplary process that can be performed by the system shown in FIGS. 6a-b for routing of packets, according to some implementations of the current subject matter;

FIG. 9 illustrates an exemplary process that can be performed by the appliance shown in FIGS. 6a-b for routing of packets, according to some implementations of the current subject matter;

FIGS. 10a and 10b illustrate exemplary system and process, respectively, for offloading/routing of packets, according to some implementations of the current subject matter;

FIGS. 11a and 11b illustrate another exemplary system and process, respectively, for offloading/routing of packets, according to some implementations of the current subject matter;

FIGS. 13a and 13b illustrate a further exemplary system and process, respectively, for offloading/routing of packets, according to some implementations of the current subject matter;

FIGS. 14a and 14b illustrate another exemplary system and process, respectively, for offloading/routing of packets, according to some implementations of the current subject matter;

DETAILED DESCRIPTION

To address the deficiencies of currently available solutions, one or more implementations of the current subject matter provide methods, systems, and devices for offloading traffic in a wireless communication system. The following is a description of an exemplary wireless communication system, e.g., a long term evolution communication system.

Figure 1A:
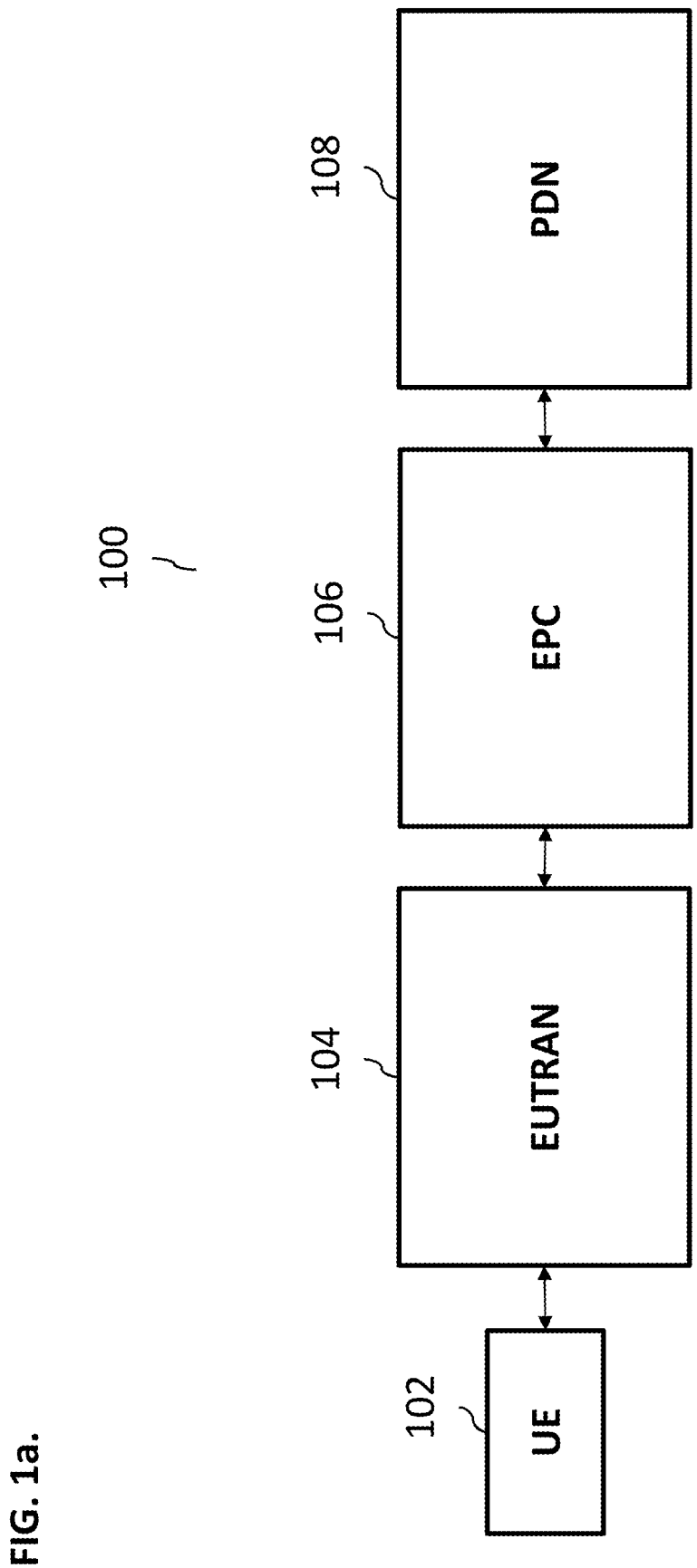
FIG. 1a illustrates an exemplary conventional long term evolution (LTE) communications system.
Figure 1B:
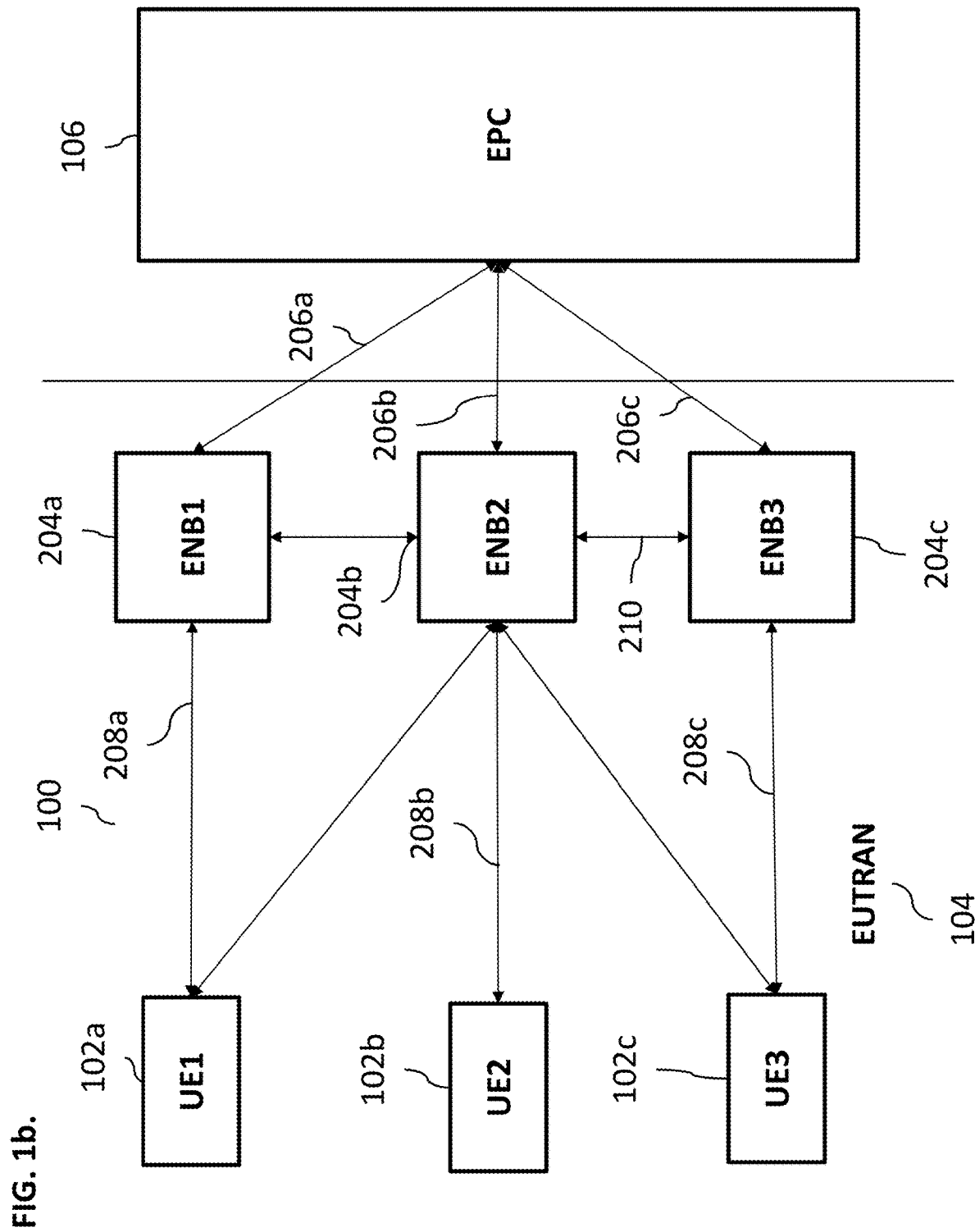
Figure 1C:
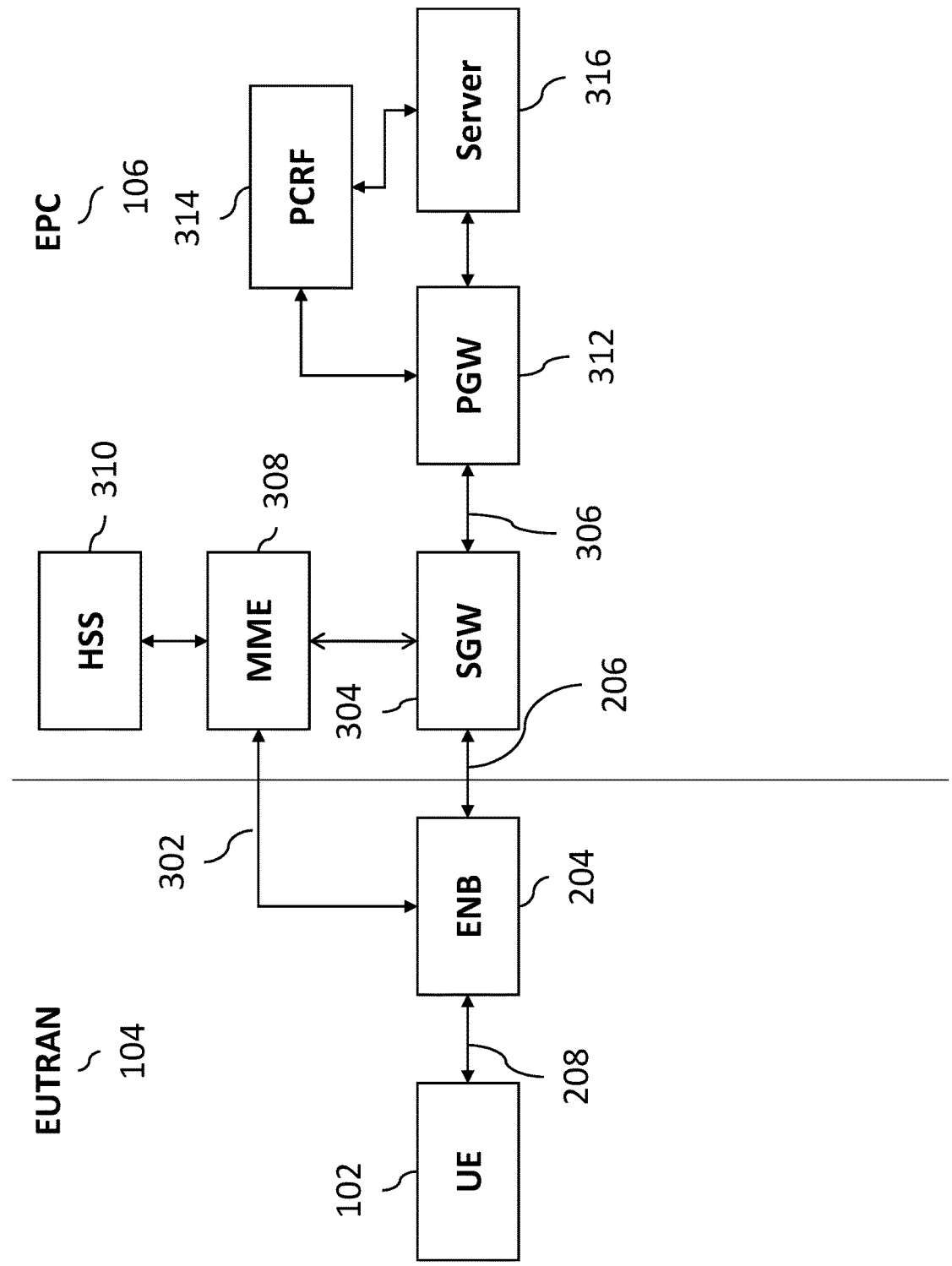
FIG. 1c illustrates additional detail of the evolved packet core of the system shown in FIG. 1b.

FIGS. 1a-1c illustrate an exemplary conventional long term evolution (LTE) communication system 100 along with its various components. An LTE system is governed by a standard for wireless communication of high-speed data for mobile telephones and data terminals. The standard is based on the GSM/EDGE (Global System for Mobile Communications"/"Enhanced Data rates for GSM Evolution) as well as UMTS/HSPA (Universal Mobile Telecommunications System"/"High Speed Packet Access) network technologies. The standard is developed by the 3GPP (3rd Generation Partnership Project).

As shown in FIG. 1a, the system 100 can include an evolved universal terrestrial radio access network (EU-TRAN) 104, an evolved packet core (EPC) 106, and a packet data network (PDN) 108, where the EUTRAN 104 and EPC 106 provide communications between a user equipment 102 and the PDN 108. The EUTRAN 104 can include a plurality of evolved node B's (eNodeB" or "ENODEB" or "enodeb" or "eNB) or base stations 204(a, b, c)) that provide communication capabilities to a plurality of user equipment 102(a, b, c). The user equipment 102 can be a mobile telephone, a smartphone, a tablet, a personal computer, a personal digital assistant (PDA), a server, a data terminal, and/or any other type of user equipment, and/or any combination thereof. The user equipment 102 can connect to the EPC 106 and eventually, the PDN 108, via any eNodeB 204. Typically, the user equipment 102 can connect to the nearest, in terms of distance, eNodeB 204. In the LTE system 100, the EUTRAN 104 and EPC 106 work together to provide connectivity, mobility and services for the user equipment 102.

FIG. 1b illustrates further detail of the network 100 shown in FIG. 1a. As stated above, the EUTRAN 104 includes a plurality of eNodeBs 204, also known as cell sites. The eNodeBs 204 provide radio functions and performs key control functions including scheduling of air link resources or radio resource management, active mode mobility or handover, and admission control for services. The eNodeBs 204 are responsible for selecting which mobility management entities (MMES, as shown in FIG. 1c) will serve the user equipment 102 and for protocol features like header compression and encryption. The eNodeBs 204 that make up the EUTRAN 104 collaborate with one another for radio resource management and handover.

Communication between the user equipment 102 and the eNodeB 204 occurs via an air interface 208 (also known as "LTE-Uu" interface). As shown in FIG. 1b, the air interface 208a provides communication between user equipment 102a and the eNodeB 204a. The air interface 208 uses Orthogonal Frequency Division Multiple Access (OFDMA)

and Single Carrier Frequency Division Multiple Access (SC-FDMA), an OFDMA variant, on the downlink and uplink respectively. OFDMA allows use of multiple known antenna techniques, such as, Multiple Input Multiple Output (MIMO).

The air interface 208 uses various protocols, which include a radio resource control (RRC) for signaling between the user equipment 102 and eNodeB 204 and non-access stratum (NAS) for signaling between the user equipment 102 and MME (as shown in FIG. 1c). In addition to signaling, user traffic is transferred between the user equipment 102 and eNodeB 204. Both signaling and traffic in the system 100 are carried by physical layer (PHY) channels.

Multiple eNodeBs 204 can be interconnected with one another using an X2 interface (e.g., X2 interface 210 connecting ENB2 204b and ENB3 204c). The X2 interface can be established between two eNodeBs in order to provide an exchange of signals, which can include load- or interference-related information as well as handover-related information. The eNodeBs 204 communicate with the evolved packet core 106 via an S1 interface 206(a, b, c). The S1 interface 206 can be split into two interfaces: one for the control plane (i.e., S1-MME interface 302) and the other for the user plane (i.e., S1-U interface).

The EPC 106 establishes and enforces Quality of Service (QoS) for user services and allows user equipment 102 to maintain a consistent internet protocol (IP) address while moving. It should be noted that each node in the network 100 has its own IP address. The EPC 106 is designed to interwork with legacy wireless networks. The EPC 106 is also designed to separate control plane (i.e., signaling) and user plane (i.e., traffic) in the core network architecture, which allows more flexibility in implementation, and independent scalability of the control and user data functions.

The EPC 106 architecture is dedicated to packet data and is shown in more detail in FIG. 1c. The EPC 106 includes a serving gateway (SGW) 304, a PDN gateway (PGW) 312, a mobility management entity (MME) 308, a home subscriber server (HSS) 310 (a subscriber database for the EPC 106), and a policy control and charging rules function (PCRF) 314. Some of these (such as SGW, PGW, MME, and HSS) are often combined into nodes according to the manufacturer's implementation.

The SGW 304 functions as an IP packet data router and is the user equipment's bearer path anchor in the EPC 106. Thus, as the user equipment moves from one eNodeB 204 to another during mobility operations, the SGW 304 remains the same and the bearer path towards the EUTRAN 104 is switched to talk to the new eNodeB 204 serving the user equipment 102. If the user equipment 102 moves to the domain of another SGW 304, the MME 308 will transfer all of the user equipment's bearer paths to the new SGW. The SGW 304 establishes bearer paths for the user equipment to one or more PGWs 312. If downstream data are received for an idle user equipment, the SGW 304 buffers the downstream packets and requests the MME 308 to locate and reestablish the bearer paths to and through the EUTRAN 104.

The PGW 312 is the gateway between the EPC 106 (and the user equipment 102 and the EUTRAN 104) and PDN 108 (shown in FIG. 1a). The PGW 312 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 102 and PGW 312. The subscriber can use services on PDNs served by different PGWs, in which case the user equipment has at least one bearer path established to each PGW 312. During handover of the user equipment from one eNodeB to another, if the SGW 304 is also changing, the bearer path from the PGW 312 is switched to the new SGW.

The MME 308 manages user equipment 102 within the EPC 106, including managing subscriber authentication, maintaining a context for authenticated user equipment 102, establishing data bearer paths in the network for user traffic, and keeping track of the location of idle mobiles that have not detached from the network. For idle user equipment 102 that needs to be reconnected to the access network to receive downstream data, the MME 308 initiates paging to locate the user equipment and re-establishes the bearer paths to and through the EUTRAN 104. MME 308 for a particular user equipment 102 is selected by the eNodeB 204 from which the user equipment 102 initiates system access. The MME 308 is typically part of a collection of MMES in the EPC 106 for the purposes of load sharing and redundancy. In the establishment of the user's data bearer paths, the MME 308 is responsible for selecting the PGW 312 and the SGW 304, which will make up the ends of the data path through the EPC 106.

The PCRF 314 is responsible for policy control decision-making, as well as for controlling the flow-based charging functionalities in the policy control enforcement function (PCEF), which resides in the PGW 312. The PCRF 314 provides the QoS authorization (QoS class identifier (QCI) and bit rates) that decides how a certain data flow will be treated in the PCEF and ensures that this is in accordance with the user's subscription profile.

As stated above, the IP services or servers are provided by the PDN 108 (as shown in FIG. 1a).

One of the primary functions of the eNodeB 204 is radio resource management, which includes scheduling of both uplink and downlink air interface resources for user equipment 102, control of bearer resources, and admission control. The eNodeB 204, as an agent for the EPC 106, is responsible for the transfer of paging messages that are used to locate mobiles when they are idle. The eNodeB 204 also communicates common control channel information over the air, header compression, encryption and decryption of the user data sent over the air, and establishing handover reporting and triggering criteria. As stated above, the eNodeB 204 can collaborate with other eNodeB 204 over the X2 interface for the purposes of handover and interference management. The eNodeBs 204 communicate with the EPC's MME via the S1-MME interface and to the SGW with the S1-U interface. Further, the eNodeB 204 exchanges user data with the SGW over the S1-U interface. The eNodeB 204 and the EPC 106 have a many-to-many relationship to support load sharing and redundancy among MMEs and SGWs. The eNodeB 204 selects an MME from a group of MMEs so the load can be shared by multiple MMEs to avoid congestion.

The system 100, as shown in FIGS. 1a-1c, can be implemented as a centralized cloud radio access network (CRAN). The CRAN can provide for a large scale centralized deployment that allows a significant number (e.g., hundreds of thousands, etc.) of remote radio heads (RRH) to connect to a centralized baseband unit (BBU) pool. In the CRAN, any BBU can communicate with other BBUs within the BBU pool using high bandwidths (e.g., 10 Gbit/s or more) and low latency. Further, the CRAN also provides an open platform real-time virtualization capability, which can ensure that the resources in the BBU pool are allocated dynamically to base stations.

Figure 2:
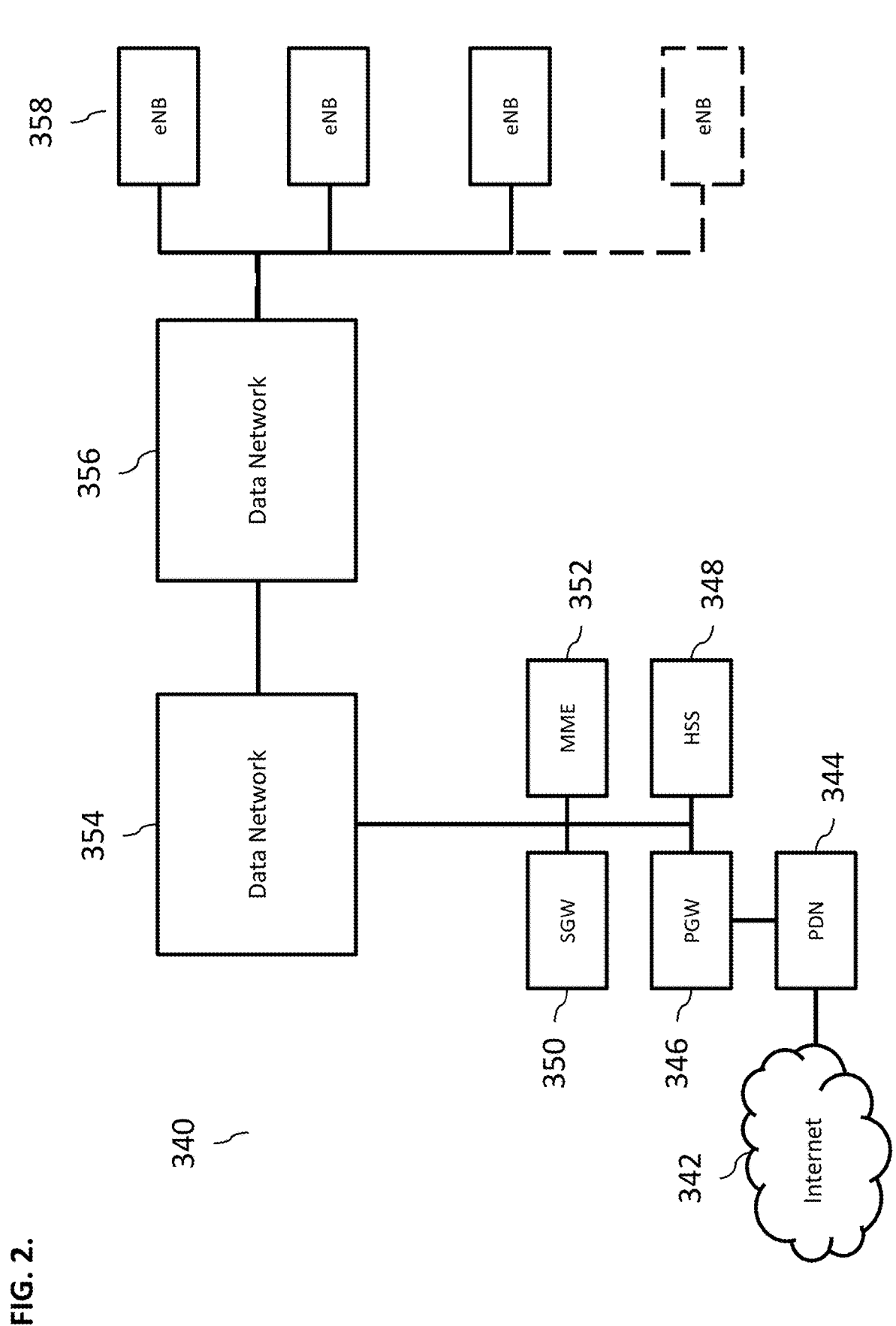
FIG. 2 illustrates an exemplary communications system that includes components of systems shown in FIGS. 1a-1c.

FIG. 2 illustrates an exemplary communications system 340. The system 340 can include similar components to systems shown in FIGS. 1a-1c. In particular, the system 340 can include one or more data networks 354, 356, which can be communicatively coupled with each other as well as to one or more base stations (e.g., eNodeBs) 358 and to a core network that can include an SGW 350, an MME 352, a PGW 346, an HSS 348, a PDN 344, as well as various other components. The core network components (e.g., PDN 344) can be communicatively coupled to an internet and/or any other network 342. The eNodeBs 358 can provide communication capabilities to various user equipment (e.g., wireless telephones, smartphones, tablet computers, personal computers, etc.) (not shown in FIG. 2).

Using system 340, user equipment can transmit a request for data through the data networks 354, 356 and the core network to one or more servers that may be located in the internet 342. In response to the request, the servers can transmit the requested data to the user equipment. The process is typically high-resource consuming, compute intensive, prone to data/path loss, errors, can suffer from poor quality of service, can have higher costs of data transmission/reception, etc.

In some implementations, the current subject matter provides backhaul and content routing/offloading using a local IP access appliance system (LIPA). This system can be placed at several and/or any location within a communications network (e.g., such as a network described above in reference to FIGS. 1a-1c, 2), e.g., a tower site, regional hub sites and 'cloud RAN' baseband processing sites.

Figure 3:
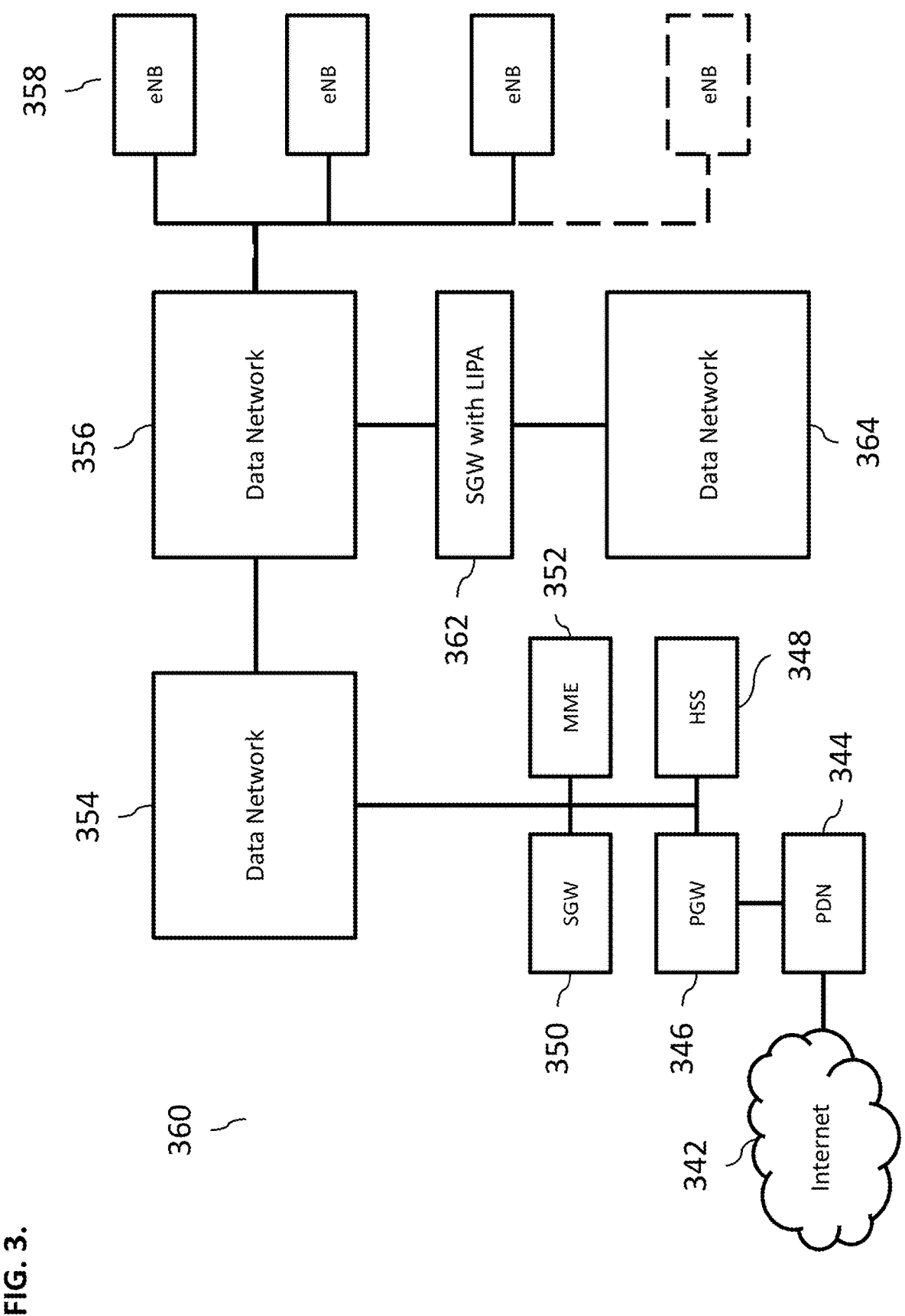
FIG. 3 illustrates an exemplary system that can provide data off-loading capabilities, according to some implementations of the current subject matter.

FIG. 3 illustrates an exemplary system 360 that can provide data off-loading capabilities, according to some implementations of the current subject matter. In addition to the components shown in FIG. 2, system 360 can include a serving gateway (SGW) with backhaul and content routing/offloading using a local IP access appliance system (LIPA) component 362 that can be communicatively coupled to one or more data networks 364. In some implementations, depending on the data received from and/or transmitted to a user equipment (not shown in FIG. 3), the SGW with LIPA component 362 can determine whether that data should be transmitted to the data network 364 and/or follow the default route by going through to the servers contained in the internet 342, as discussed below.

Figure 4:
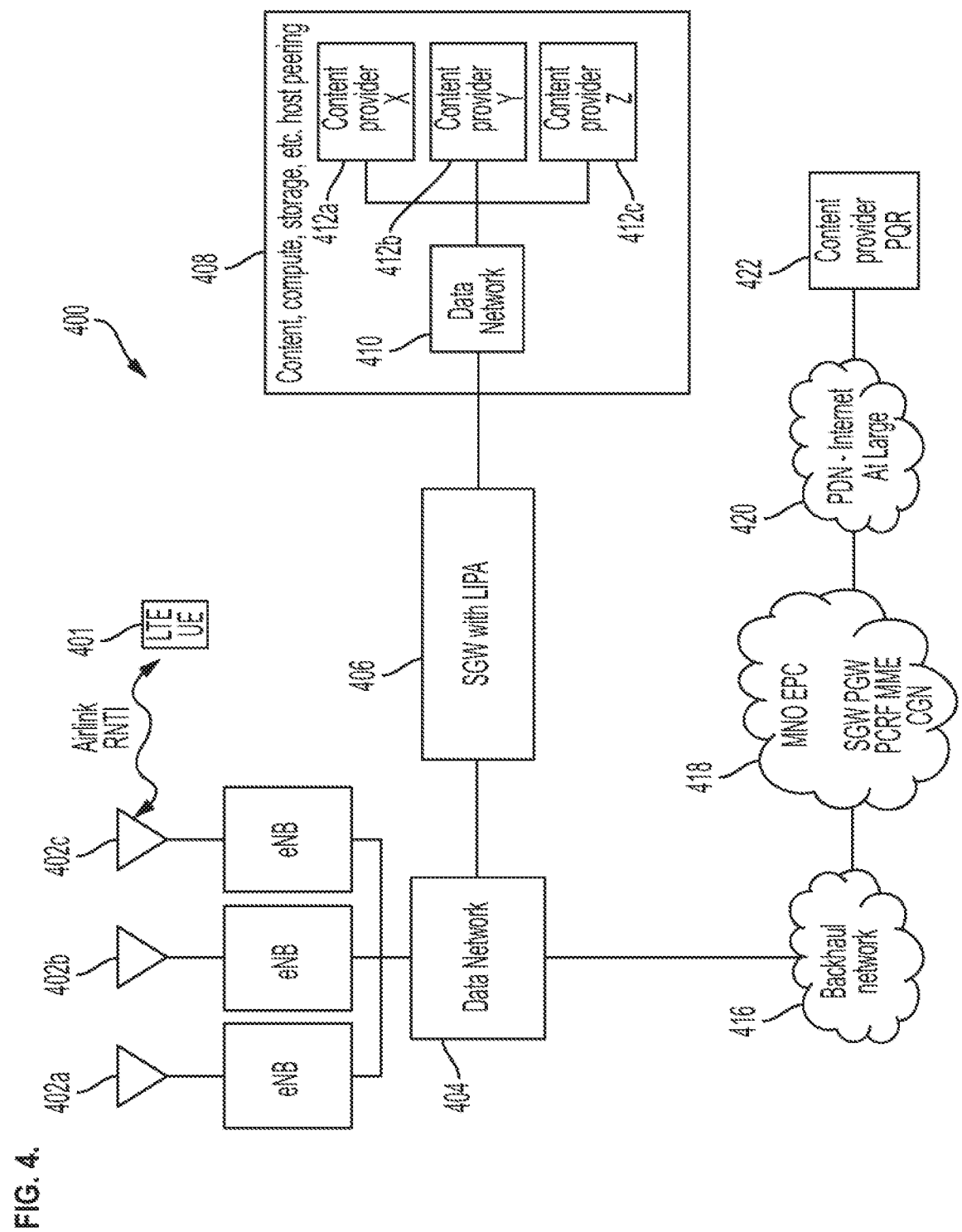
FIG. 4 illustrates an exemplary communications system for providing backhaul and content offloading/routing, according to some implementations of the current subject matter.

FIG. 4 illustrates an exemplary communications system 400 for providing backhaul and content offloading, according to some implementations of the current subject matter. The system 400 is similar to the system 360 shown in FIG. 3. The system 400 can include one or more user equipments 401, one or more base stations 402(a, b, c), a data network 404, a backhaul network 416, an EPC 418, the Internet 420, a content provider server 422, a LIPA appliance 406 (similar to the SGW with LIPA component 362 shown in FIG. 3), and a host peering appliance or system 408 (similar to the data network component 364 shown in FIG. 3). A mobile network operator (MNO) can provide/control operation of the base station 402, the data network 404, the LIPA appliance 406, the EPC 418, and the Internet 420. Backhaul components can include an Ethernet transport equipment (not shown in FIG. 4), the backhaul network 416 (these components can be provided by/controlled by a network provider), and a data network (e.g., an Ethernet switch) 410 (located within the host peering appliance 408). Content providers can be associated with the content provider servers 422 and 412 (a, b, c) (the latter being located within the host peering appliance 408). In some exemplary implementations, the LIPA appliance can be placed proximate to one or more eNodeBs 402 (e.g., at the physical location of the tower).

The LIPA appliance 406 can provide content backhaul and content offloading based on an identification of a source, type, and/or any other information associated with a data transmission (e.g., data packet(s)) received by the LIPA appliance 406 and/or based on any other parameters. Once the information associated with the data transmission is determined, the LIPA appliance 406 can execute an appropriate routing decision for the purposes of routing the received data packet(s). In some implementations, the LIPA appliance 406 can also incorporate one or more functionalities of a serving gateway (SGW).

The appliance 406 can be any computing device, including hardware, software, and/or any combination thereof for performing functions described herein. The appliance 406 can also have various communications capabilities and can be communicatively coupled to the data network 404 as well as host peering appliance 408, as shown in FIG. 4. The appliance 406 can also be communicatively coupled to any component within the system 400. The appliance 406 can include one or more communications ports that can allow receipt/transmission of data packets from/to the EPC 418 as well as one or more communication ports that can allow receipt/transmission of data packets from/to content providers 412. In some implementations, the appliance 406 does not perform storage of data packets that may be received by the appliance 406, and instead, as stated above, can route such data packets to an appropriate destination, as described in further detail below.

Figure 8:
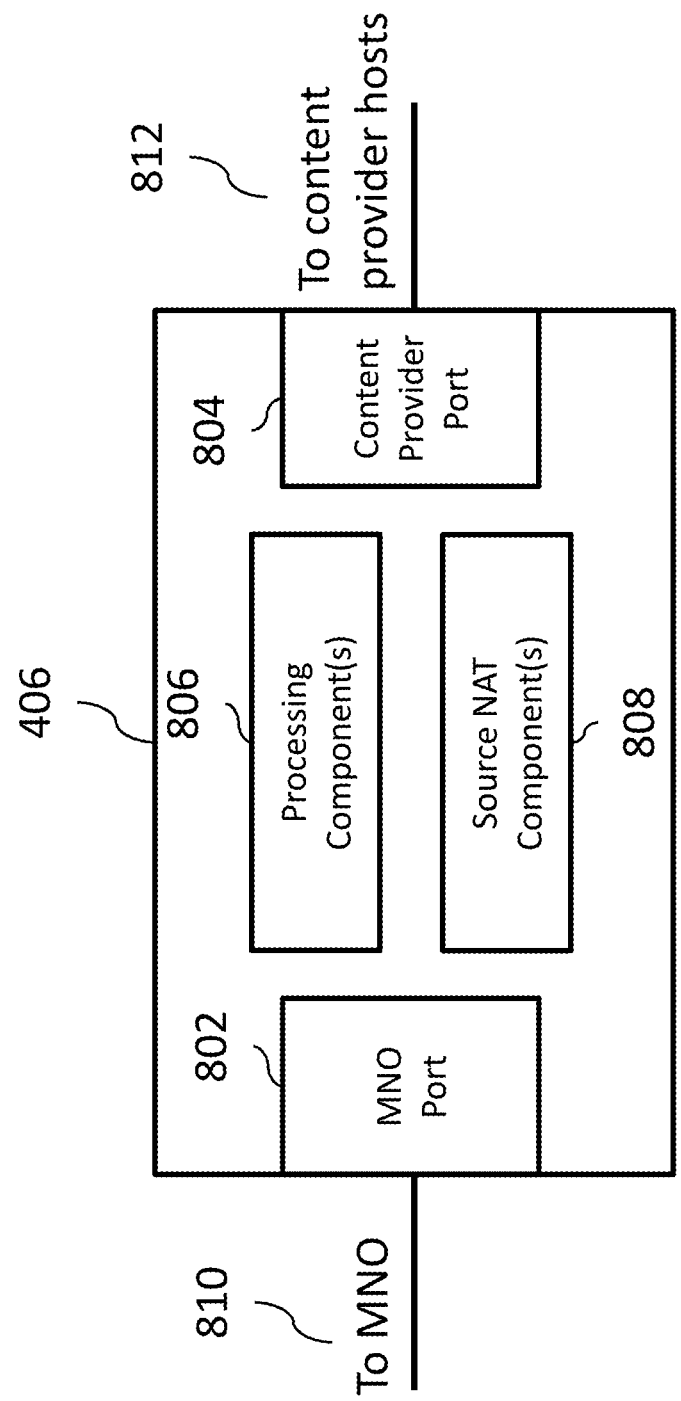
FIG. 8 illustrates an exemplary block diagram of the appliance shown in FIGS. 6a-b, according to some implementations of the current subject matter.

FIG. 8 illustrates an exemplary block diagram of the appliance 406, according to some implementations of the current subject matter. The appliance 406 can include one or more processing components 806, one or more ports 802, one or more ports 804, and one or more source network address translation (NAT) components 808. The ports 802 can communicatively couple the appliance 406 to mobile network operator (MNO) transport, backhaul and/or other IP-access network components/services 810. The ports 802 can receive and/or transmit data packets and/or any other information to and from the evolved packet core 418 and other mobile network operator components (e.g., components 342-356 shown in FIG. 3). The ports 804 can communicatively couple the appliance 406 to content provider host systems 812 (e.g., data network 364 shown in FIG. 3). The ports 804 can receive and/or transmit data packets (e.g., requests for data content, responses to requests to data content, etc.) to and from content provider hosts. In some exemplary implementations, the ports 802, 804 can be unshielded twisted pair (UTP) gigabit Ethernet ports.

In some implementations, the port 802 (also referred to as "MNO facing" port) can be configured with IP addressing appropriate to reach the mobile network operator's EPC components 418 and/or any eNodeBs 402 that the appliance 406 can be communicatively coupled with (as shown in FIG. 4). The port 802 can be used to route content requests/responses to content requests via a "default route" (e.g., a route that is used by the appliance 406 to obtain content from a content provider, other than a peering host content provider). In some exemplary implementations, the MME, eNodeBs, and other mobile network operator devices that the appliance 406 communicates with can be directly wire-adjacent on the configured IP subnet, and/or can be off-subnet and/or reachable by static IP routes entered into the host systems software routing table.

In some implementations, the port 804 (also referred to as "content facing" port) can be configured with appropriate IP addresses to communicate with local peering exchange network (e.g., with host peering system 408, as shown in FIG. 4). The port 804 can be used by the appliance 406 to route content requests/responses to content request via a known "content route" to the peering content provider hosts. To enable communications with the local peering exchange network, the local peering exchange network operator can determine appropriate addresses (as shown in FIG. 4) and provide them to the mobile network operator and/or appliance 406.

In some implementations, the source NAT components 808 can be provided with a user equipment source NAT range, which can also be coordinated with the operator of the peering exchange network. In some implementations, each appliance 406 can be assigned a unique user equipment NAT range of addresses, which can be supplied to each content provider that it peers with. Unique source NAT address range can allow content providers to deliver packets intended for each user equipment communicating with the mobile network operator, which avoids confusion as to which mobile network operator components/user equipments should receive the data packets from content providers.

In some implementations, the NAT features of the source NAT components 808 can include session state based on both user equipment source IP address and GTP TED assigned to the user equipment/eNodeB session. This information can permit source NAT components 808 to distinguish between various user equipments, content requests, etc.

As can be understood, the appliance 406 can include various other processing components (e.g., processing components 806), software, hardware, and/or any combination thereof. The appliance 406 can be configured have various communication capabilities and can be communicatively coupled to any component within the communication system (as for example, shown in FIGS. 4-6) using wired connection(s), wireless connection(s), and/or any combination thereof. In some implementations, the appliance 406 can be and/or can include any computing device(s), telephone(s), wireless telephone(s), smartphone(s), tablet computer(s), personal computer(s), laptop computer(s), server (s), gateway(s), networking element(s), network(s) of devices, wireless and/or wired receiver(s) and/or transceiver (s), base station(s), router(s), modem(s), and/or any other type of devices, and/or any combinations thereof.

Figure 5:
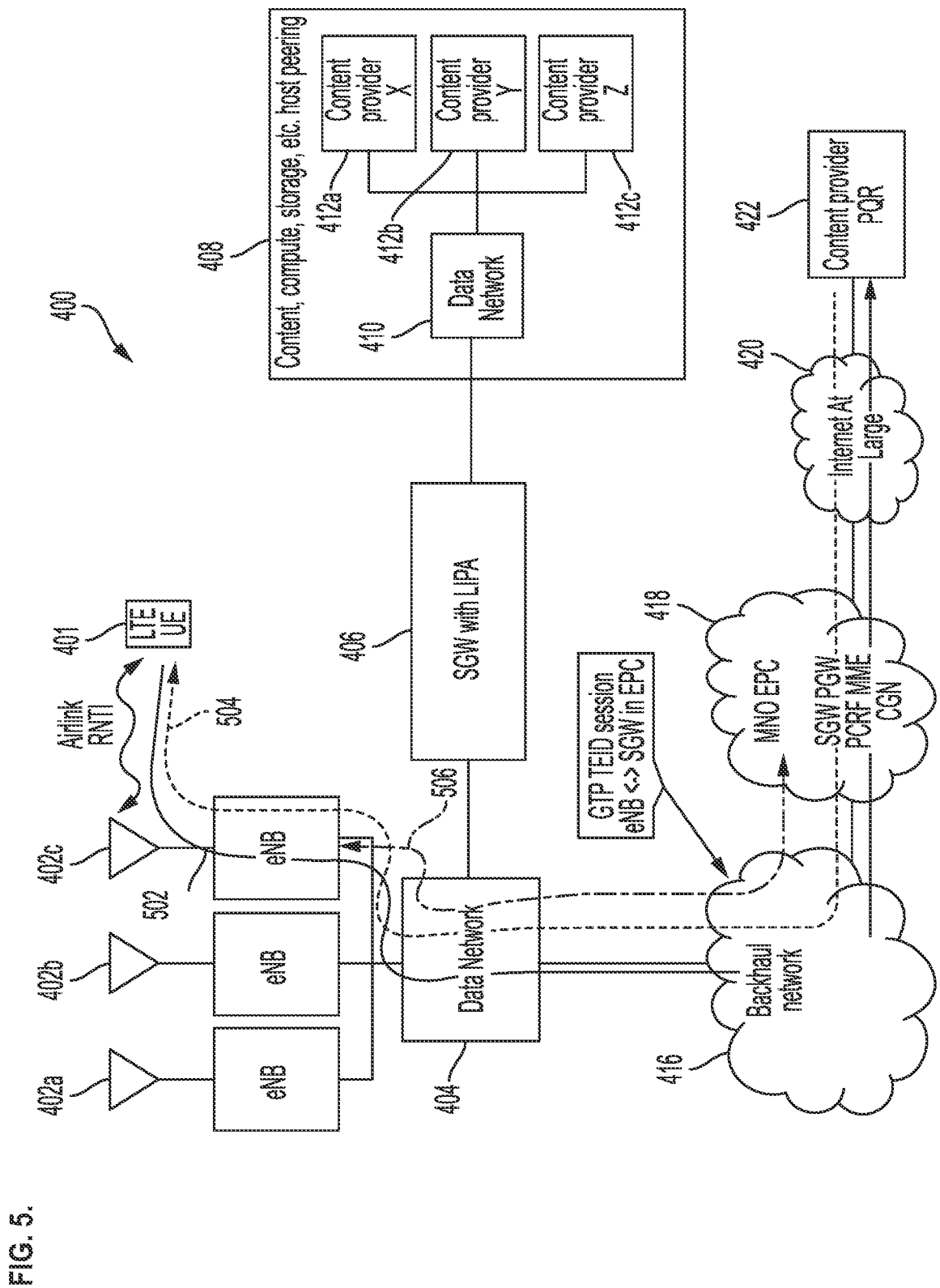
FIG. 5 illustrates an exemplary routing procedures executed during a normal data bearer session path using system shown in FIG. 4.

FIG. 5 illustrates an exemplary routing procedures executed during a normal data bearer session path using system 400 shown in FIG. 4. In a communications session, the user equipment 401 can transmit a request for data content via an airlink (radio network temporary identifier (RNTI)) interface to the base station 402 (e.g., base station 402c). The base station 402 can be provided/controlled by a mobile network operator (MNO). The user equipment 401's request for content can be transmitted to the content provider 422 along path 502 and data responsive to the request returned from the content provider 422 via a path 504. The data packets can be transmitted between the user equipment 401 and the content provider using a GTP (GPRS tunneling protocol (i.e., a communication protocol used by the LTE to deliver IP packets within the EPC)), where a unique tunnel endpoint identifier (TED) is assigned to each GTP control connection to the peers and a unique TED is assigned to each GTP user connection (bearer) to the peers. The TED is a 32-bit number field in the GTP packet (GTP-C (which is used to deliver the controlling signals over S11 and S5) or GTP-U (which is used to deliver application payload (user data) over S1 and S5)). The TED can be generated during the initial attach procedure (i.e., a procedure during which a user equipment registers with a network to receive services requiring registration). As shown by the double-arrow 506, a create session request can be generated, which includes the S11 MME DL TED and the S5 SGW DL TED (where DL stands for downlink), both of which are generated and included by MNO EPC (MME and SGW components) 418. The create session response can include the S5 PGW UL TED and the S11 SGW UL TED (where UL stands for uplink), which can be generated and included by the MNO EPC (PGW and SGW components) 418.

Figure 6A:
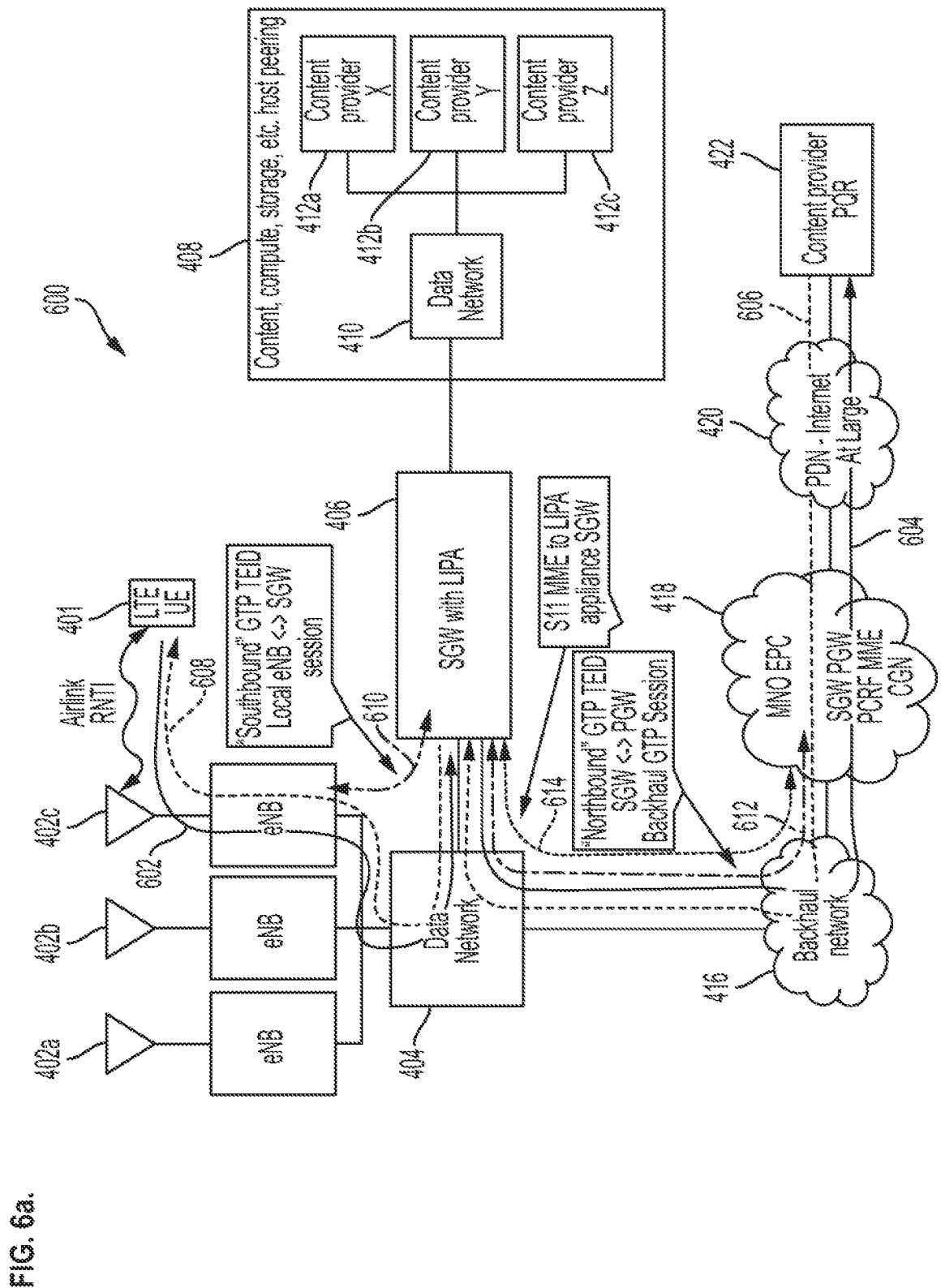
FIGS. 6a-b illustrate an exemplary system for offloading/routing of packets, according to some implementations of the current subject matter.
Figure 6B:
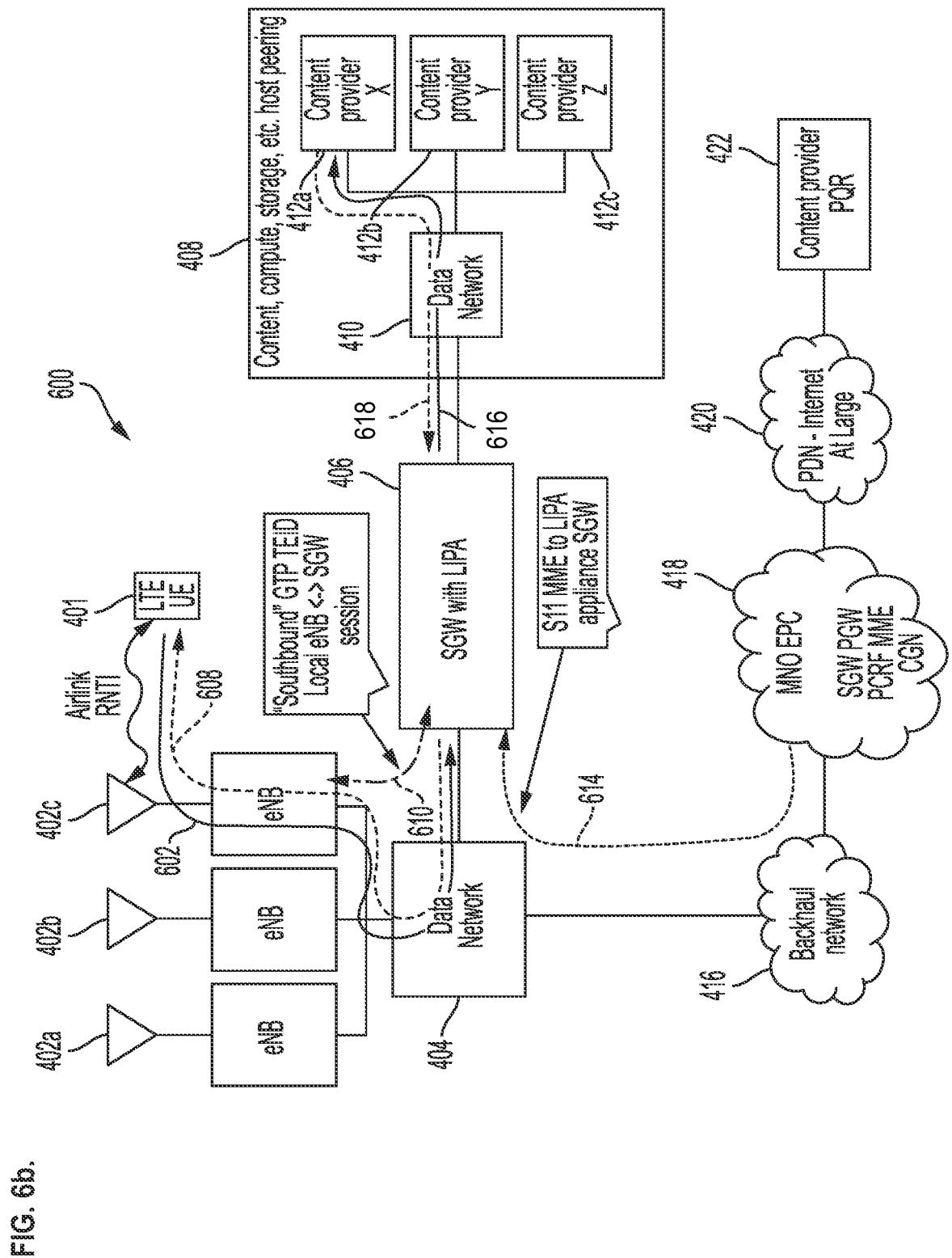

FIGS. 6a-b illustrate an exemplary system 600 for offloading/routing of packets, according to some implementations of the current subject matter. While the system 600 includes components shown in FIGS. 4 and 5, it performs routing decisions using the LIPA appliance 406. In some implementations, the appliance 406 can implement GTP proxy features and SGW S11 GTP-C interfaces, which can allow mobile network operator's EPC (MME) 418 to direct a GTP session from the base station/cell site 402 (e.g., 402c) to the appliance 406. The appliance 406 can be located at or, otherwise, proximate to the cell site 402. The presence of a serving gateway's functionalities at the cell site (or proximate thereto, as shown in FIG. 6a) does not change the flow of the data transmission between endpoints in the system 600. In some implementations, the SGW at the appliance 406 can be controlled by the mobile network operator's MME for the purposes of directing corresponding GTP sessions from itself to the evolved packet core's MNO (SGW) 418, as normally occurs. GTP packets flowing through the appliance 406 can processed using normal IP routing mechanisms. A standard 'Default IP Route' (e.g. 0/0, etc.) can direct tunneled user equipment's IP packets to mobile network operator's EPC (PGW) as normal, using MME-controlled GTP TED session tunnels. User equipment IP addressing and bearer control can be handled by the EPC (PGW) 418. Any local IP routes learned from content provider systems can be designated as "more specific routes," and user equipment IP packets can be forwarded to the corresponding content providers, if the destination IP address is matched during route lookup. Routes can be exchanged between the appliance 406 with content provider hosts or routers through the standard border gateway protocol (BGP).

As shown in FIG. 6a, the user equipment can transmit, via route 602, a request for content to the base station 402c. The request can then be routed through the data network (e.g., mobile network operator controlled switch) 404 to the appliance 406. A local base station (e.g., eNodeB) to SGW at the appliance 406 GTP TED session 610 can be established (as shown by "Southbound GTP TEID Local eNB<->SGW session" in FIG. 6a). Based on the received request, the appliance 406 can extract information from the received request (as discussed below with regard to FIG. 7) to determine further routing of the received data packets. Content requests received from the base station can be routed along a "content route" (i.e., to local content providers 412 (a, b, c)) or along a "default route" (i.e., to content provider 422 via EPC). Once the responses are received by the appliance 406, they can be routed to the base station via route 608.

Upon determination that the received content request should be routed along a "default route", the appliance can transmit the content request, via route 604, to the mobile network controlled EPC 418, which can then transmit it to the content provider 422. The content provider 422 can generate a response and transmit it, via route 606, toward the EPC 418, which can then route it to the appliance 406. To ensure that content requests and responses to content requests are routed through the appliance 406, a backhaul GTP session 612 can be established (as shown by "Northbound GTP TED SGW<->PGW Backhaul GTP Session in FIG. 6*a*). Additionally, to provide MME control of the appliance 406, an S11 MME to appliance 406 SGW connection 614 can be established. Upon receipt of the response to the content request via the "default route", the appliance 406 can transmit, via route 608, responsive data packets to the base station 402*c*, which can deliver them to the user equipment 401 via the airlink.

FIG. 6*b* illustrates further details of the communications occurring between the appliance 406 and the host peering appliance or system 408. As discussed above, a content or data request from the user equipment 401 is routed, via route 602 (shown by solid lines in FIGS. 6*a*-*b*), to the base station 402*c* and then through the data network 404 to the appliance 406. Once the appliance 406 processes the received request, it can transmit it, via route 616, to the host peering appliance 408. The transmitted request can then be routed through a data network 410 of the host peering appliance 408 to an appropriate content provider 412*a*. The host peering appliance 408 can include one or more content providers 412, as shown in FIG. 6*b*. The content provider 412 can be selected based on the information/data obtained from the request received from the appliance 406, via route 616. In some implementations, the host peering appliance 408 (and/or appliance 406) can include a mechanism that can perform a lookup to determine which content provider 412 has the data requested in the received content request. The content providers 412 can be any storage locations, memory locations, processors, servers, databases, etc., and/or any combination thereof.

Once the requested content is located, the content provider 412*a* can transmit a response, including the information/data requested in the received request, via route 618, through the data network 410, to the appliance 406. The appliance 406 can transmit the received responsive information/data to the base station 402*c* via route 608, as discussed above. In some implementations, the appliance 406 can be directly (and/or indirectly) connected to any interfaced computing and/or communications system using any type of connection, e.g., any type of data network. In some exemplary, non-limiting implementations, the connections can include at least one of the following: one or more links (e.g., physical links, Ethernet links, IP links, physical domain(s) shared by one or more data transmitters/receivers/transceivers, radio waves, waveguides/coaxial connections, optical waves in free space/fiber, electromagnetic wave(s) on metal wire(s), dielectric guide(s), and/or any other connections and/or any combination thereof), one or more switched/hubbed emulated connections, one or more independent point-to-point connections and/or circuits, another one or more networks/data routers (which can be connected to one or more other data networks of same and/or different types), and/or any other type of connections and/or any combinations thereof. While FIG. 6*b* (as well as discussion of FIG. 7 below) illustrate one of the ways the system 600 can operate, other ways of routing data using appliance 406 are possible, as will be discussed below.

FIG. 7 illustrates an exemplary process 700 that can be performed by the appliance 406 (as shown in FIGS. 6*a*-*b*) for routing of packets, according to some implementations of the current subject matter. The system 600 can initially make a determination whether a GTP packet arrived on the MNO facing port 802 (as shown in FIG. 8) or an IP packet arrived on the content facing port 804 (as shown in FIG. 8). If the GTP packet arrived on the MNO facing port 802, the appliance 406 can perform processing operations 702-734 (even numbered). If the IP packet arrived on the content facing port 804, the appliance 406 can perform processing operations 703-717 (odd numbered).

Upon determination that a GTP packet has arrived on the MNO facing port 802, at 702, a determination can be made whether the GTP packet has been transmitted from mobile network operator's PGW (i.e., MNO (PGW) 418 as shown in FIG. 6*a*). If the GTP packet was transmitted from the mobile network operator's PGW, the appliance 406 can access a state table (which can be stored by the appliance 406) to determine whether GTP TED associated with the GTP packet is stored in that table, at 730. If so, the GTP packet can be forwarded to the determined eNodeB associated with the GTP TED using the MNO facing port 802, at 732-734.

If it is determined that the GTP TED of the GTP packet is not in the state table accessed by the appliance 406, at 730, the GTP packet can be discarded, at 728, and any further forwarding/transmission of the GTP packet can end. Similarly, if, at 704, it is determined that the GTP packet is not from mobile network operator's PGW, and it is not transmitted from mobile network operator's eNodeB, at 706, the GTP packet can also be discarded, at 728, thereby ending further processing of the GTP packet.

If it is determined that the GTP packet is from mobile network operator's eNodeB, at 706, the source NAT component 808 (as shown in FIG. 8) of the appliance 406 can determine whether the GTP TED corresponds to a source NAT entry stored by the appliance 406, at 708. In some implementations, a NAT state table can include entries that "live" in a table that can be stored (e.g., primarily) in system's random access memory, specialized content-addressable memory, n-ary content addressable memory, and/or any other type of memory and/or any combination thereof. The storing of the table can depend upon load and/or store performance parameters/objectives. In some implementations, the table may or may not include other state information. Further, the NAT table can include a combination of storage and/or association of both GTP TED assignments for bearer paths towards an eNodeB and/or towards a PGW. In some implementations, GTP state tables can be separate from address translation tables, which can depend on various factors. The NAT table and other tables can be populated using at least one of the following methods: 1) a lookup exception-handling update (e.g., execute allocation and table update/insert routines in the case of "NO MATCH" found for a particular combination of GTP TED and/or GTP TED and UE source IP address and/or UE source IP address only); 2) a pre-allocation update (e.g., the NAT table can be populated upon receipt of S11 control plane signaling messages from the MNOs MME, where the messages can instruct the SGW software component to allocate and/or associate both a S5/8 and S1-U TEID pairing, and/or are available to trigger additional functions (e.g., this event can be used to trigger an insertion of a new NAT association with a given TEID/UE IP and TEID/UE IP)); 3) an offload-triggered NAT allocation (e.g., a routing lookup for determination of "locally offloaded" IP destination prefixes can occur before execution of address translation, whereby in these cases, no NAT activity occurs until a user equipment transmits an IP datagram towards one such offloaded destination IP address falling within an offload-able IP network prefix).

If a stored source NAT entry does not exist, the appliance 406 can allocate a source NAT entry to the GTP packet's TEID from a pool of entries, at 710. In some implementations, available entries in the pool can be known to the NAT application software/logic using at least one of the following methods: 1) a static declaration using an explicit configuration; 2) a learned through dynamic routing protocol(s); 3) a learned and/or shared by network-delivered configuration directive(s). In some implementations, a set of addresses including one or more addresses and/or entire address prefixes (e.g., ranges of desired addresses), using which the NAT application code can represent the user equipment's original IP address, can be defined and/or exposed. The address declaration can be used to logically calculate and/or update the NAT table updates on an as-needed basis using the table population processes discussed above.

Otherwise, if an entry already exists, the GTP packet can be de-encapsulated and a translation of the user equipment's source IP address can be performed by the appliance 406, at 712. Then, after translation, an IP packet can be provided to the host system virtual interface, at 714. In some implementations, a host computer operating system can provide IP routing (e.g., an offload routing table) functions. In this case, the GTP encapsulation and/or de-encapsulation software can exchange IP packets with the host operating system through a system-provided network interface application programming interface and/or other functional network interface emulation mechanism. The host operating can expose to the GTP software one or more such software virtual and/or emulated physical interfaces using which the GTP processing software can both read IP packets from and/or write IP packets to in furtherance of delivering and/or offloading of intended IP packets to desired offload destinations. Additionally, traffic from such offload sources can be received and/or returned to the appropriate user equipment (e.g., via later un-NAT'ing and/or GTP re-encapsulation). In exemplary implementations where there is no provided host operating system IP routing function, and where an external router device is attached to the LIPA appliance, then the interface can become a physical data link interface of various types (e.g., Ethernet, high speed serial, PCI, PCI-E, etc.).

At 716, an offload routing table can be accessed to determine a route for the IP packet. In some implementations, an IP routing table function can be provided by a host computer operating system. The routing table can be stored in random access memory(ies) and/or any other memory type (e.g., cam, tcam, etc.). The routing table can be populated using at least one of the following methods: 1) entry and/or definition of a "static" route(s); 2) a routing protocol (e.g., OSPF, BGP, etc.) receives routes from external routers and/or other similar systems and then instructs a host IP routing table, through an API or other mechanism, of the routes it should contain and their associated attributes (e.g., metrics, next-hop interfaces/IP addresses, label imposition, pop, swap, etc.). In some implementations, the IP routing functions can be "external" from the GTP and/or NAT functions.

If the route is contained in the offload routing table, at 718, the IP packet can then be forwarded to the indicated next-hop via content facing port 804, at 726.

If the route is not in the offload routing table, at 718, the IP packet is provided to the GTP/NAT daemon virtual interface, at 720. In some implementations, a host computer operating system can provide IP routing (e.g., an offload routing table) functions. In this case, the GTP encapsulation and/or de-encapsulation software can exchange IP packets with the host operating system using a system-provided network-like interface API and/or other functional network interface emulation mechanism. The host operating can expose one or more such software virtual and/or emulated physical interfaces to the GTP software, with which the GTP software can read IP packets from and/or write IP packets to in furtherance of delivering and/or offloading intended IP packets to desired offload destinations. Further, traffic from such offload sources can be received and/or returned to the appropriate user equipment (e.g., via later un-NAT'ing and GTP re-encapsulation), as discussed above. In exemplary implementations where there is no provided host operating system IP routing function, and where an external router device is attached to the LIPA appliance 406, then this interface can be a physical data link interface (e.g., Ethernet, high speed serial, PCI, PCI-E, etc.). The appliance 406 can then perform a lookup of the source IP address associated with the packet in the user equipment NAT table, translate source address to original user equipment source IP address, and encapsulate it with known GTP TED and PGW destination, at 722. The NAT processing logic can use a single table, which can associate any, some, and/or all of the user equipment IP address(es) and/or associated S1u and S5/8 GTE TEIDs. Then, the GTP packet is forwarded to determined PGW of the mobile network provider via MNO facing port 802 (as shown in FIG. 8), at 724.

If an IP packet is received on the content facing port 804, at 703, the appliance 406 can perform a lookup of a table containing a user equipment source NAT ranges. If the route associated with the received IP packet is not in the user equipment source address table, at 707, the IP packet can be discarded, at 709, and any further processing of the IP packet can be terminated. If the route is in the user equipment source address table, at 707, the appliance 406 can provide the IP packet to the GTP/NAT daemon virtual interface, at 711. At 713, the appliance 406 can then determine whether the packet's destination IP address is allocated to existing TED translation. If not, the IP packet is discarded, at 709. If it has been allocated, then the appliance 406 can translate NAT-range destination IP address to user equipment destination address, encapsulate it with matching GTP TED, and set destination GTP IP address to target eNodeB, at 715. At 717, subsequent to the encapsulation, a GTP packet can be forwarded to the determined eNodeB using MNO facing port 802 (as shown in FIG. 8).

In some exemplary implementations, only GTP packets can be sent and/or received using the MNO facing port 802 and only IP packets can be received on the content facing port 804. Further, GTP packets can be exchanged only with eNodeBs and SGWs that were identified by the EPC (MME) 418 (as shown in FIGS. 6a-b) during bearer establishment via the S11 GTP-C interface protocol. Hence, forwarding of packets can be performed in accordance with the following:

GTP packets from MNO EPC (PGW/SGW) 418 can only be forwarded towards the eNodeBs 402 containing the user equipment session as signaled by the EPC's MME;

IP packets from content host peering systems 408 can only be forwarded towards user equipments via GTP TEIDs as signaled by the EPC's MME;

GTP packets from eNodeBs containing encapsulated user equipment IP packets can be inspected and routed based on the encapsulated destination IP address of the user equipment's IP packet;

GTP packets can be de-encapsulated and network address translated if the IP destination is a known content route;

GTP packets can be re-encapsulated and forwarded along the SGW GTP session if the IP destination is not a known content route and, instead, matches a default route.

FIG. 9 illustrates an exemplary process 900 that can be performed by the appliance 406 (as shown in FIGS. 6a-b) for routing of packets, according to some implementations of the current subject matter. As discussed above, the system 600 can initially make a determination whether a GTP packet arrived on the "MNO facing" port 802 (as shown in FIG. 8) or an IP packet arrived on the "content facing" port 804 (as shown in FIG. 8). If the GTP packet arrived on the MNO facing port 802, the appliance 406 can perform processing operations 902-918 (even numbered). If the IP packet arrived on the content facing port 804, the appliance 406 can perform processing operations 901-909 (odd numbered).

Upon determination that a GTP packet has arrived on the MNO facing port 802, at 902, a determination can be made whether the GTP packet has been transmitted from mobile network operator's PGW (i.e., MNO (PGW) 418 as shown in FIGS. 6a-b), at 904. If the GTP packet was transmitted from the mobile network operator's PGW, the appliance 406 can act similar to an SGW, i.e., forward GTP packet to the eNodeB that hosts a particular TED, at 908 and the GTP packet can be forwarded to the determined eNodeB associated with the GTP TED using the MNO facing port 802, at 910.

If, at 904, it is determined that the GTP packet is not from mobile network operator's PGW, and it is not transmitted from mobile network operator's eNodeB, at 906, the GTP packet can also be discarded, at 912, thereby ending further processing of the GTP packet.

If it is determined that the GTP packet is from mobile network operator's eNodeB, at 906, a determination can be made whether the encapsulated user equipment IP packet destination IP address is in an offload table, at 914. If so, the GTP packet can be de-encapsulated, at 916. Then, the IP packet can then be forwarded to the indicated next-hop via content facing port 804, at 918. Otherwise, if the packet destination IP address is not in the offload table, at 914, the GTP packet can be forwarded to determined PGW of the mobile network provider via MNO facing port 802 (as shown in FIG. 8), at 911.

If an IP packet is received on the content facing port 804, at 901, the appliance 406 can determine whether the content IP packet destination IP address is in UE/SGW session table, at 903. If not, the IP packet can be discarded, at 905, and any further processing of the IP packet can be terminated. If so, the appliance 406 can encapsulate content IP packet with GTP header and associated TED value for UE destination address, at 907. At 909, subsequent to the encapsulation, a GTP packet can be forwarded to the determined eNodeB using MNO facing port 802 (as shown in FIG. 8).

Figure 10A:
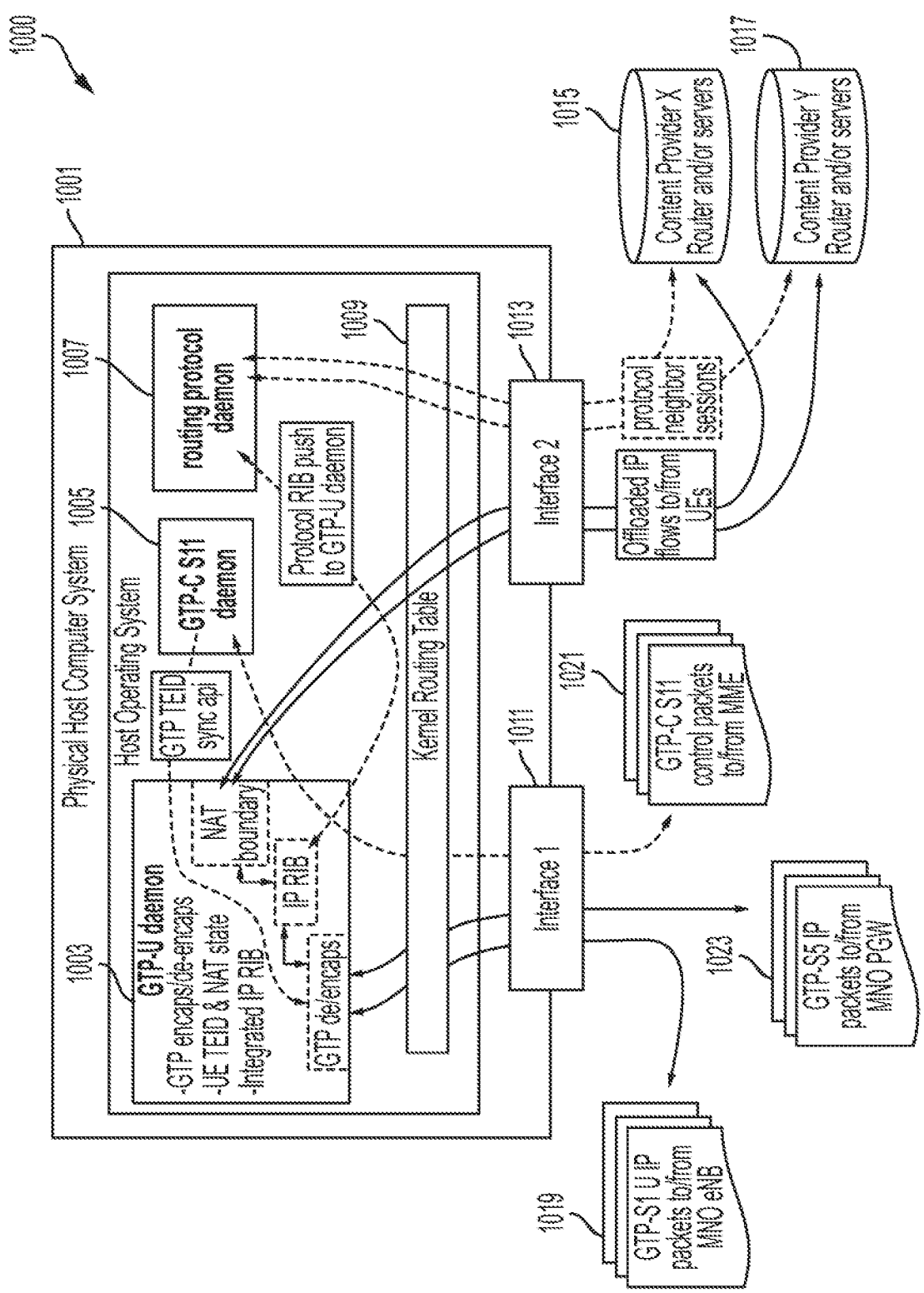
Figure 11A:
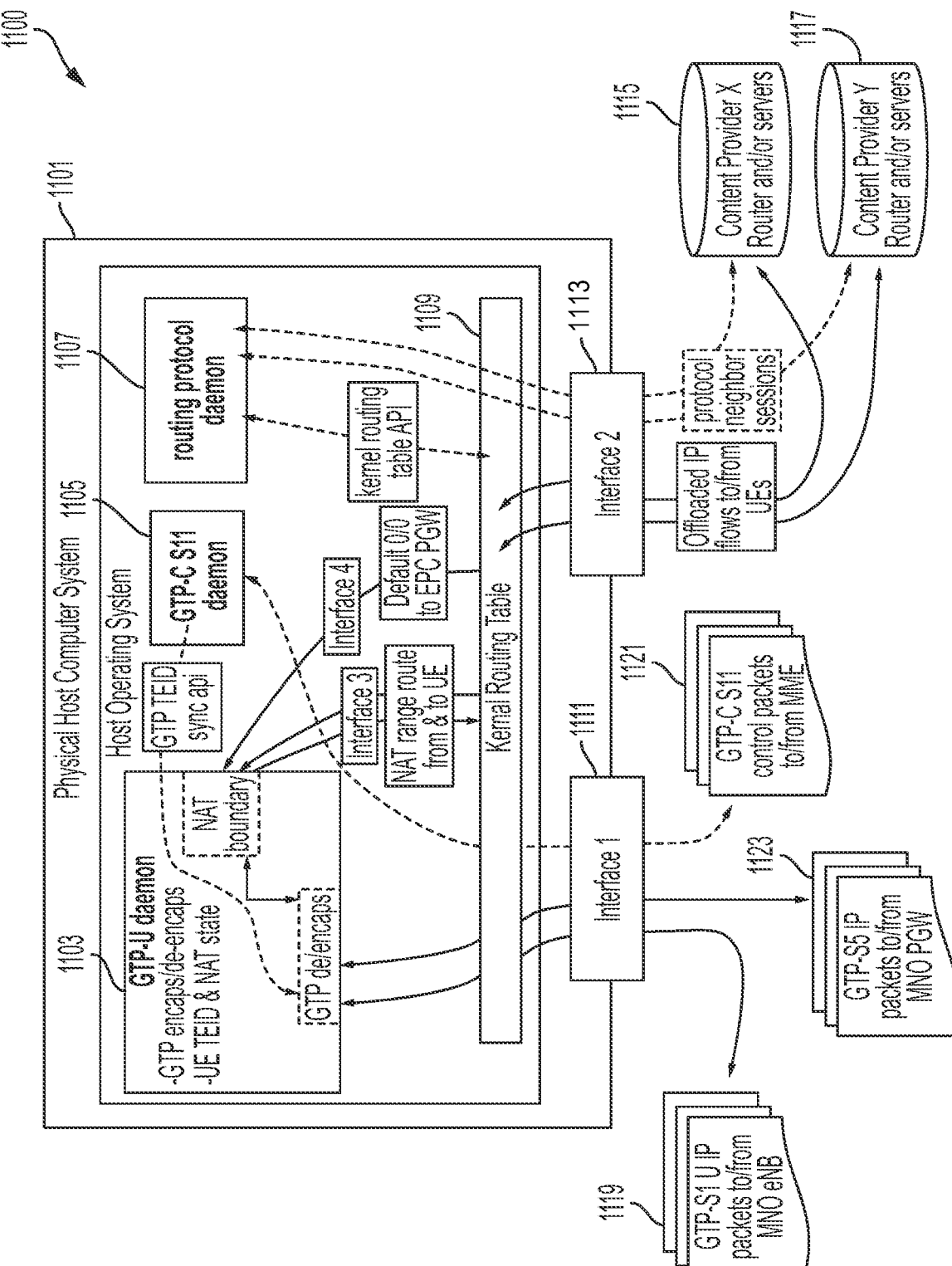
Figure 12A:
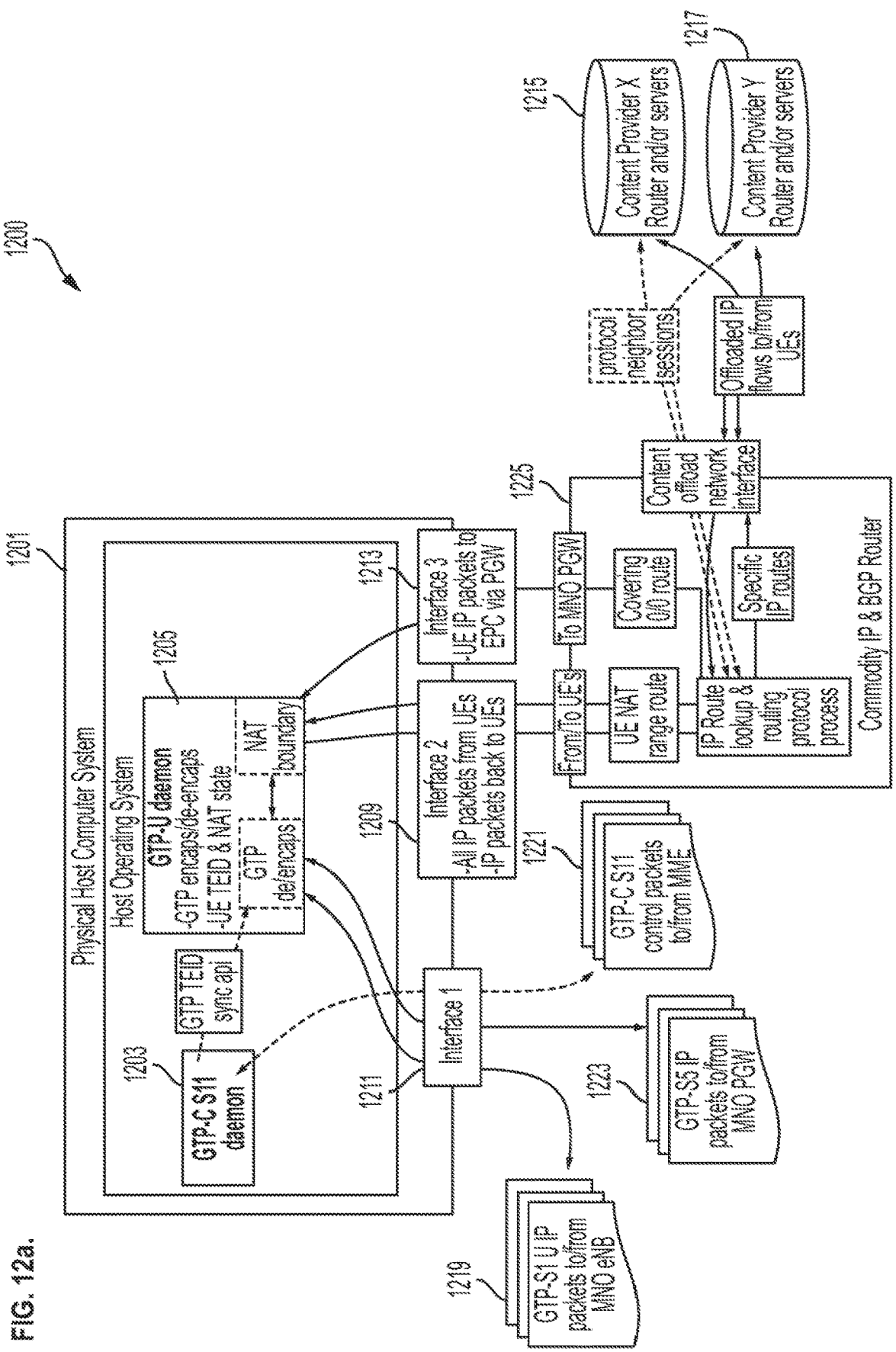
FIGS. 12a and 12b illustrate yet another exemplary system and process, respectively, for offloading/routing of packets, according to some implementations of the current subject matter.
Figure 12B:
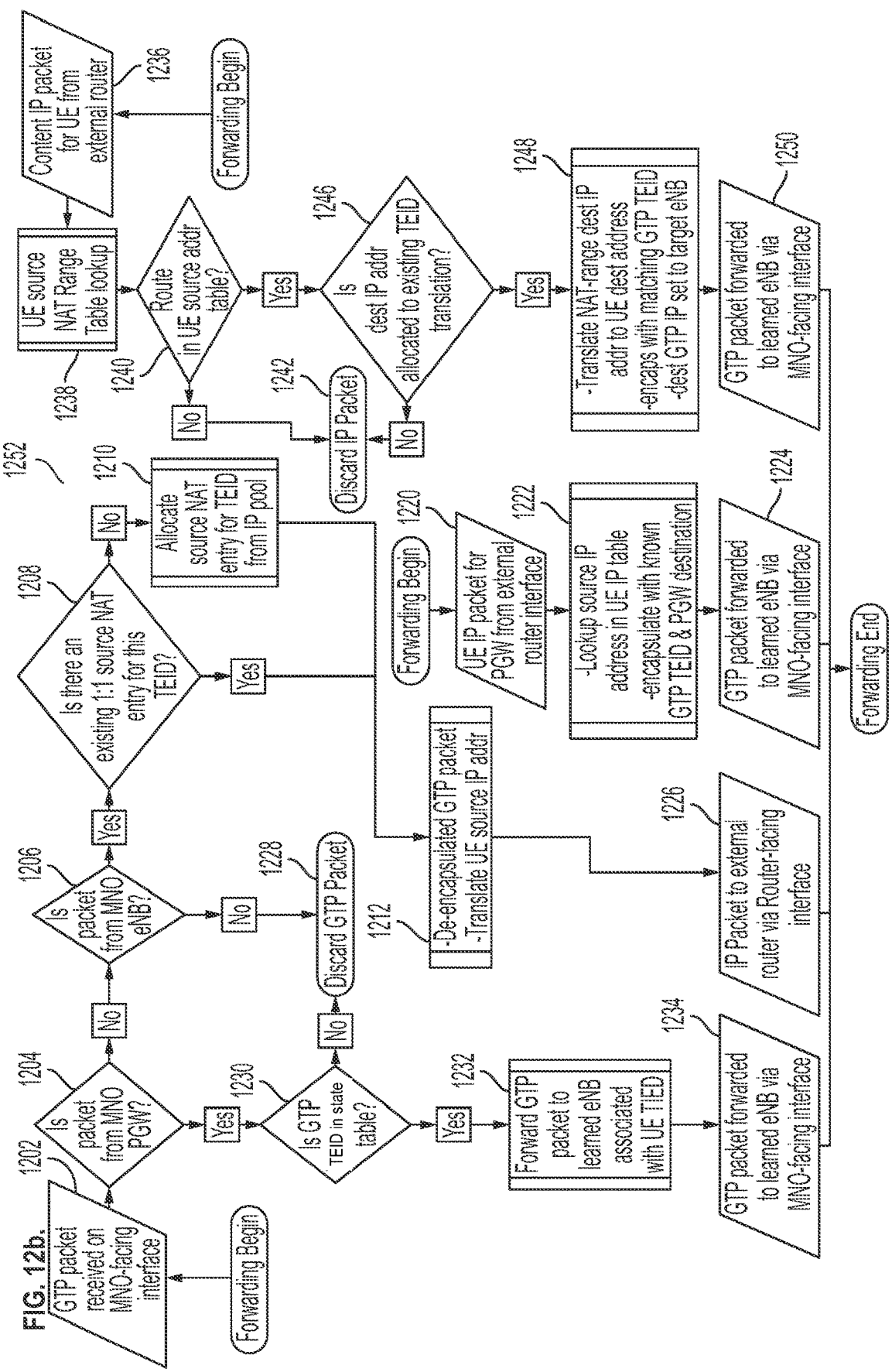
Figure 13A:
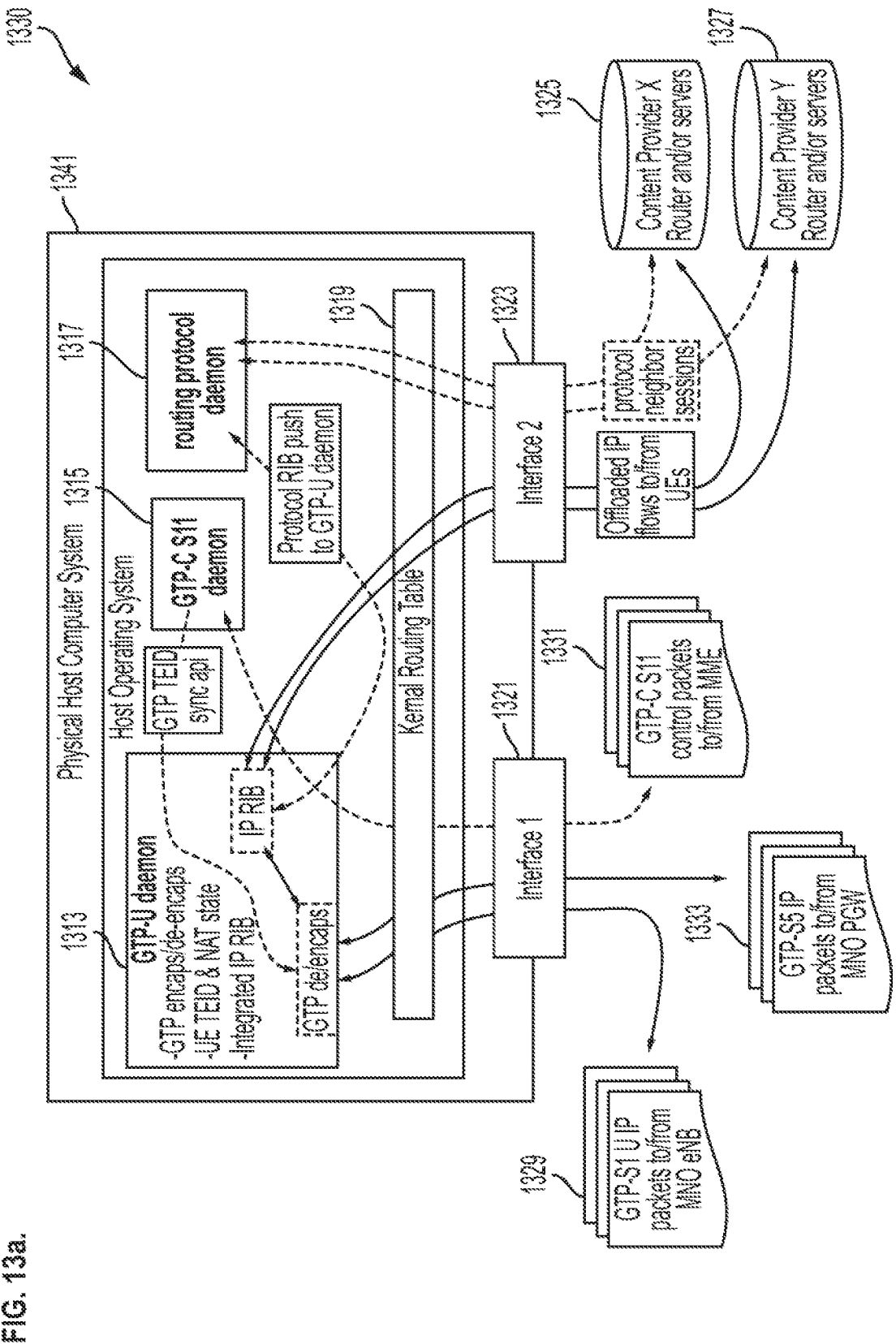
Figure 14A:
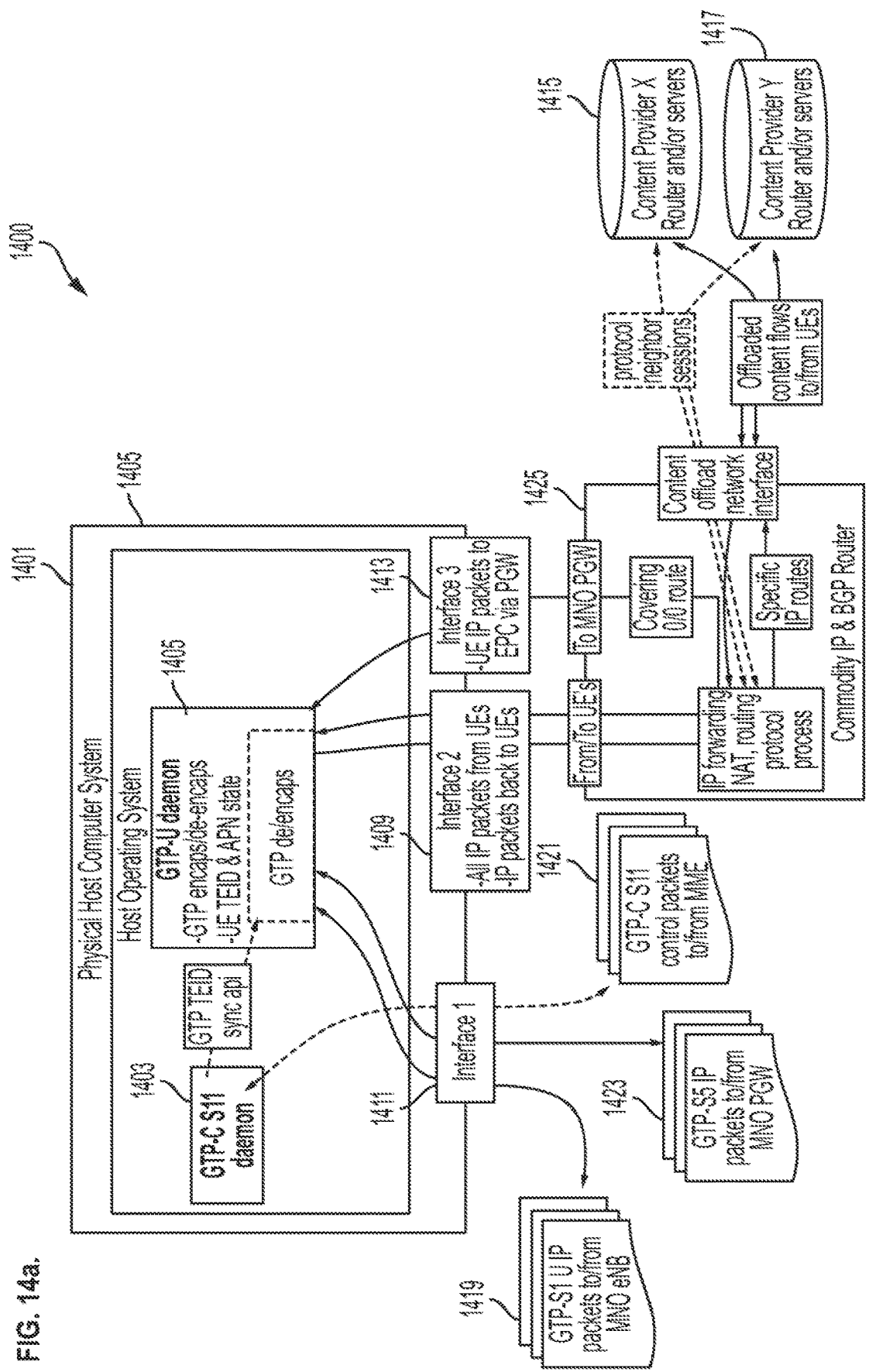

The following provides a discussion of various ways for offloading and/or routing data using system 400 shown in FIGS. 4-5. FIGS. 10a-b illustrate an exemplary system 1000 and a process 1050, respectively for performing integrated routing of data, including network address translation, using the appliance 406 ("Type 1 System"). FIGS. 11a-b illustrate an exemplary system 1100 and a process 1152, respectively for performing routing of data, whereby the appliance 406 performs network address translation and includes a separate operating system (OS) that performs the routing ("Type 2 System"). FIGS. 12a-b illustrate an exemplary system 1200 and a process 1252, respectively for performing routing of data, whereby an external system performs routing of data ("Type 3 System"). FIGS. 13a-b illustrate an exemplary system 1330 and a process 1300, respectively for performing routing of data, whereby no network address translation is performed and the routing functionalities are integrated into the appliance 406 ("Type 4 System"). FIGS. 14a-b illustrate an exemplary system 1400 and a process 1452, respectively for performing routing of data, whereby no network address translation is performed and routing functionalities are external to the appliance 406 ("Type 5 System"). Use of the above systems/processes can be dependent on an implementation environment (e.g., bandwidth-, throughput-, power-limited, etc. environments). By way of a non-limiting example, types 3 and 5 systems can be used in an environment that requires throughput of more than 100 Gps, whereas other types can be used in environments that do not require high throughput. Power demand may also affect which system types are used.

Type 1 System

FIGS. 10a and 10b illustrate an exemplary system 1000 and a process 1050, respectively, for offloading/routing of packets, according to some implementations of the current subject matter. The system 1000 can be implemented where the LIPA appliance (e.g., LIPA appliance 406) can provide routing and network address translation (NAT) functionalities. The system 1000 and process 1050 can be incorporated into/performed by any of the systems discussed above with regard to FIGS. 4-8.

Referring to FIG. 10a, the system 1000 can include a physical host computing system 1001, which can include a host kernel having a GTP-U daemon 1003, a GTP-C S11 daemon 1005, a routing protocol daemon 1007, and a kernel routing table 1009. The computing system 1001 can also include an interface 1 1011 and an interface 2 1013. Interface 1011 can be used for processing GTP-U IP packets 1019 to/from MNO's eNodeBs and/or SGW, GTP-U IP packets 1023 to/from MNO's PGW, and GTP-C S11 control packets 1021 to/from MNO's MME. Interface 1013 can be used to process offloaded content flows to/from user equipments and protocol neighbor sessions with content provider routers and/or servers 1015, 1017.

The GTP-U daemon 1003 can include components that can perform GTP encapsulation/de-encapsulation, determine UE TED and NAT states, and can include an integrated IP routing information base (RIB). The GTP-U daemon 1003 and GTP-C S11 daemon 1005 can be communicatively coupled using a GTP TED synchronization API interface, which can be used for transmission of data for the purposes of performing encapsulation/de-encapsulation of data packets. The packets 1019 and 1023 can be received, via the interface 1011 and kernel routing table 1009, and processed by the daemon 1003 encapsulation/de-encapsulation components. The control packets 1021 can be received by the daemon 1005 via the interface 1011 and kernel routing table 1009 also. The routing protocol daemon 1007 can push protocol RIB data to the GTP-U daemon 1003's RIB.

Similar to FIGS. 7 and 9 discussed above, FIG. 10b illustrates an exemplary process 1050 that can be performed by the system 1000 (as shown in FIG. 10a) for routing of packets, according to some implementations of the current subject matter. The system 1000 can initially make a determination whether a GTP packet arrived on the "MNO facing" interface or an IP packet arrived on the "content facing" interface. If the GTP packet arrived on the MNO facing interface, the system 1000 can perform processing operations 1002-1026. If the IP packet arrived on the content facing interface, the system 1000 can perform processing operations 1028-1042.

Upon determination that a GTP packet has arrived on the MNO facing interface, at 1002, a determination can be made whether the GTP packet has been transmitted from mobile network operator's PGW. If the GTP packet was transmitted from the mobile network operator's PGW, the system 1000 can access a state table to determine whether GTP TEID associated with the GTP packet is stored in that table, at 1010. In some implementations, the table can include various data structures, which, by way of a non-limiting example, can include at least one of the following: a linked list, an indexed list, an ordered list, a multi-level lookup-abstracted data structure, and/or any other data structures, and/or any combination thereof. Upon receipt of a data packet, the table can be accessed and an appropriate determination as to how the data packet should be processed and/or discarded can be made. By way of a non-limiting example, the table can include one or more of the following exemplary types of data in a row: [unique index] [UE IMSI][UE GUTI][EPS bearer ID][s1u TEID][s1u eNb destination IP][s5/8 TEID][s5/8 TEID PGW destination IP][assigned UE PDN IP address]. As can be understood, other data (including more or less than the above listing) can be included in the table. In some implementations, the table can "reside" within the GTP-U daemon 1003, and/or can be "part" of the GTP de-encapsulation/encapsulation function block of the GTP-U daemon 1003, as shown in FIG. 10a. Referring back to FIG. 10b, if the GTP TEID is stored in the table, the GTP packet can be forwarded to the determined eNodeB associated with the UE TEID using the MNO facing interface, at 1024-1026.

If it is determined that the GTP TEID of the GTP packet is not in the state table, at 1010, the GTP packet can be discarded, at 1012, and any further forwarding/transmission of the GTP packet can end. Similarly, if, at 1004, it is determined that the GTP packet is not from mobile network operator's PGW, and it is not transmitted from mobile network operator's eNodeB, at 1006, the GTP packet can also be discarded, at 1012, thereby ending further processing of the GTP packet.

If it is determined that the GTP packet is from mobile network operator's eNodeB, at 1006, the system 1000 can perform an offload routing table lookup, at 1008. In some implementations, the offload table can include IP routing information (also known as the IP RIB table of the GTP-U daemon process 1003 shown in FIG. 10a). The table can be stored in memory and/or other fast-retrieval data storage location. In some exemplary, non-limiting implementations, the table can include one or more of the following entries of a format: [unique index][destination ip prefix][destination ip prefix length][next-hop IP address][optional: layer-2 adjacency address][optional: layer-1 and layer 2 output interface index][optional: layer-2 source address]. In some implementations, the current subject matter system can include one or more tables that can contain entries with matching index values stored in the IP RIB table (part of the process 1003 shown in FIG. 10a). For example, in some exemplary implementations of IP routers, "layer 2 adjacency" and "layer 2 rewrite" tables can be external and/or can be abstracted away from the IP routing tables. Such separate tables can be used for scalability and/or performance purposes. After IP route lookups occur, the "layer 2 adjacency" table can be accessed to determine, for example, source and/or destination Ethernet addresses that should be used on the generated Ethernet frame that will contain an IP packet. Maintaining these tables as separate data structures can be used in implementations where Ethernet switching and/or IP route lookup is performed in parallel and/or using dedicated, specialized hardware (i.e., CAM, TCAM, etc.). Referring back to FIG. 10b, if the route is not in the offload table, at 1014, then the GTP packet can be forwarded to the determined PGW using the MNO facing interface, at 1042.

If the route is in the offload routing table, at 1014, a determination can be made as whether there is an existing one-to-one correspondence with a source NAT entry for a particular TEID, at 1016. If not, a source NAT entry for the TEID is allocated from the IP address pool, at 1018. In some implementations, available entries in the pool can be known to the NAT application software/logic using at least one of the following methods: 1) a static declaration using an explicit configuration; 2) a configuration learned through dynamic routing protocol(s); 3) a learned and/or shared by network-delivered configuration directive(s). In some implementations, a set of addresses including one or more addresses and/or entire address prefixes (e.g., ranges of desired addresses), using which the NAT application code can represent the user equipment's original IP address, can be defined and/or exposed. The address declaration can be used to logically calculate and/or update the NAT table updates on an as-needed basis using the table population processes discussed above.

In some implementations, allocation and/or deallocation of entries in the NAT table can be performed using at least one of the following processes: programmatic/linear/random/pseudorandom traversal(s), with and/or without consideration of a "last-allocated" and/or "last deallocated" pointer and/or counter, with and/or without consideration of a list of configured addresses, and/or any other processes, and/or any combination thereof. Then, the results of the above processes can be compared to a signifier and/or an abstract "flag" that encodes and/or confers an "in use" and/or "not in use" state. In cases where the entire table of available addresses is complete and there are no entries that are free, exception handling logic can be executed, which can include one or more "scavenger" and/or "abort" functions. Using these functions, an allocator component can determine if it should re-claim the oldest and/or least-recently-active (i.e., one that has not had a packet match in N-unit of time) and/or other compared metric. In the abort cases, if no entries are free, the allocator component can be configured to return the packet along a "normal" forwarding path (i.e., towards the current, existing GTP TED state and known PGW), and thus not offload the packet.

In some implementations, the IP address pool can be stored in a memory, and/or managed and/or updated by the NAT function block (assuming it was so enabled in the system's configuration). In some exemplary, non-limiting implementations, the NAT table format can include at least the following items: [unique index] [UE IMSI][UE GUTI] [EPS bearer ID][UE PDN IP][UE NAT source IP].

In some implementations, the allocation process can begin with a determination if the destination IP address in a packet that arrived on the content-facing interface (from a content serving system and/or other IP system etc.) is allocated to an active translation (i.e., whether there is a unique index found when the field "UE NAT source IP" is searched using the destination address in the received "from-content" packet). If the unique index (i.e., non-null index value) is returned, then a determination is made whether the EPS bearer ID exists in the GTP state table (which can be part of the operation 1010 shown in FIG. 10b). If the EPS bearer exists in the GTP table, then the current eNodeB IP address and GTP TED value corresponding to the given UE EPS session ID are retrieved and the un-NATting processes can be performed (e.g., swap destination IP from the NAT range to the assigned UE PDN IP address).

Referring back to FIG. 10a, the processing proceeds to 1020, where the GTP packet can be de-encapsulated, a translation of the user equipment's source IP address can be performed, and the next hop can be set for appropriate IP address of content destination. Then, the IP packet can be forwarded to the indicated next-hop via content facing interface, at 1022.

If an IP packet is received on the content facing interface, at 1028, the system 1000 can perform a lookup of a table containing a user equipment source NAT ranges, at 1030. If the route associated with the received IP packet is not in the user equipment source address table, at 1032, the IP packet can be discarded, at 1034, and any further processing of the IP packet can be terminated. If the route is in the user equipment source address table, at 1032, the system 1000 can determine whether the packet's destination IP address is allocated to existing TED translation, at 1036. If not, the IP packet is discarded, at 1034. If it has been allocated, then the system 1000 can translate NAT-range destination IP address to user equipment destination address, encapsulate it with matching GTP TEID, and set destination GTP IP address to target eNodeB, at 1038. At 1040, subsequent to the encapsulation, a GTP packet can be forwarded to the determined eNodeB using MNO facing interface.

Type 2 System

FIGS. 11a and 11b illustrate exemplary system 1100 and process 1152, respectively, for offloading/routing of packets, according to some implementations of the current subject matter. The system 1100 can be used in implementations where the LIPA appliance (e.g., LIPA appliance 406) provides NAT functionalities and a separate operating system can provide routing functionalities. The system 1100 and process 1152 can be incorporated into/performed by any of the systems discussed above with regard to FIGS. 4-8.

Referring to FIG. 11a, similar to the system 1000 shown in FIG. 10a, the system 1100 can include a physical host computing system 1101, which can include a host kernel having a GTP-U daemon 1103, a GTP-C S11 daemon 1105, a routing protocol daemon 1107, and a kernel routing table 1109. The computing system 1101 can also include an interface 1 1111 and an interface 2 1113. Interface 1111 can be used for processing GTP-U IP packets 1119 to/from MNO eNB, GTP-U IP packets 1123 to/from MNO PGW, and GTP-C S11 control packets 1121 to/from MME. Interface 1113 can be used to process offloaded content flows to/from UEs and protocol neighbor sessions with content provider routers and/or servers 1115, 1117.

GTP-U daemon 1103 can be configured to provide GTP encapsulation/de-encapsulation functionalities as well as determine UE TEID and NAT states. In some implementations a separate interface ("interface 3", as shown in FIG. 11a) can be provided between the GTP-U daemon 1103 and the kernel routing table 1109 for the purposes of obtaining NAT range route to and from a user equipment. Further, an additional interface ("interface 4" as shown in FIG. 11a) can be provided for the purposes of obtaining information concerning a "default route" to EPC's PGW.

The GTP-U daemon 1103 and GTP-C S11 daemon 1105 can be communicatively coupled using a GTP TED synchronization API interface (similar to FIG. 10a), which can be used for transmission of data for the purposes of performing encapsulation/de-encapsulation of data packets. The packets 1119 and 1123 can be received, via the interface 1111 and kernel routing table 1109, and processed by the daemon 1103 encapsulation/de-encapsulation components. The control packets 1121 can be received by the daemon 1105 via the interface 1111 and kernel routing table 1109 also. The routing protocol daemon 1107 can be communicatively coupled to the kernel routing table 1109 using a kernel routing table API.

FIG. 11b (which illustrates a process similar to the process 700 shown in FIG. 7) illustrates an exemplary process 1152 that can be performed by the system 1100 (as shown in FIG. 11a) for routing of packets, according to some implementations of the current subject matter. The system 1100 can initially make a determination whether a GTP packet arrived on the "MNO facing" interface or an IP packet arrived on the "content facing" interface. If the GTP packet arrived on the MNO facing interface, the system 1100 can perform processing operations 1102-1134. If the IP packet arrived on the content facing interface, the system 1100 can perform processing operations 1136-1150.

Upon determination that a GTP packet has arrived on the MNO facing interface, at 1102, a determination can be made whether the GTP packet has been transmitted from mobile network operator's PGW. If the GTP packet was transmitted from the mobile network operator's PGW, the system 1100 can access a state table to determine whether GTP TEID associated with the GTP packet is stored in that table, at 1130. If so, the GTP packet can be forwarded to the determined eNodeB associated with the UE TEID using the MNO facing interface, at 1132-1134.

If it is determined that the GTP TEID of the GTP packet is not in the state table, at 1130, the GTP packet can be discarded, at 1128, and any further forwarding/transmission of the GTP packet can end. Similarly, if, at 1104, it is determined that the GTP packet is not from mobile network operator's PGW, and it is not transmitted from mobile network operator's eNodeB, at 1106, the GTP packet can also be discarded, at 1128, thereby ending further processing of the GTP packet.

If it is determined that the GTP packet is from mobile network operator's eNodeB, at 1106, the source NAT component can determine whether the GTP TEID corresponds to a source NAT entry, at 1108. If a stored source NAT entry does not exist, the system 1100 can allocate a source NAT entry to the GTP packet's TEID from a pool of entries, at 1110. Otherwise, if an entry already exists, the GTP packet can be de-encapsulated and a translation of the user equipment's source IP address can be performed by the system 1100, at 1112. Then, after translation, an IP packet can be provided to the host system interface, at 1114. At 1116, an offload routing table can be accessed to determine a route for the IP packet. If the route is contained in the offload routing table, at 1118, the IP packet can be forwarded to the indicated next-hop via content facing interface, at 1126.

If the route is not in the offload routing table, at 1118, the IP packet can be provided to the GTP/NAT daemon interface, at 1120. The system 1100 can then perform a lookup of the source IP address associated with the packet in the user equipment NAT table, translate source address to original user equipment source IP address, and encapsulate it with known GTP TED and PGW destination, at 1122. Then, the GTP packet can be forwarded to the determined PGW of the mobile network provider via MNO facing interface, at 1124.

If an IP packet is received on the content facing interface, at 1136, the system 1100 can perform a lookup of a table containing a user equipment source NAT ranges, at 1138. If the route associated with the received IP packet is not in the user equipment source address table, at 1140, the IP packet can be discarded, at 1142, and any further processing of the IP packet can be terminated. If the route is in the user equipment source address table, at 1140, the system 1100 can provide the IP packet to the GTP/NAT daemon interface, at 1144. At 1146, the system 1100 can then determine whether the packet's destination IP address is allocated to existing TED translation. If not, the IP packet is discarded, at 1142. If it has been allocated, then the system 1100 can translate NAT-range destination IP address to user equipment destination address, encapsulate it with matching GTP TED, and set destination GTP IP address to target eNodeB, at 1148. At 1150, subsequent to the encapsulation, a GTP packet can be forwarded to the determined eNodeB using MNO facing interface.

Type 3 System

FIGS. 12*a* and 12*b* illustrate exemplary system 1200 and process 1252, respectively, for offloading/routing of packets, according to some implementations of the current subject matter. The system 1200 can be used in implementations where the LIPA appliance (e.g., LIPA appliance 406) provides NAT functionalities and a separate external routing system provides IP routing functionalities. The system 1200 and process 1252 can be incorporated into/performed by any of the systems discussed above with regard to FIGS. 4-8.

Referring to FIG. 12*a*, similar to the systems 1000 and 1100 shown in FIGS. 10*a* and 11*a*, respectively, the system 1200 can include a physical host computing system 1201, which can include a host kernel having a GTP-U daemon 1205 and a GTP-C S11 daemon 1203. The computing system 1201 can also include an interface 1 1211, an interface 2 1209, and an interface 3 1213. Interface 1211 can be used for processing GTP-S1 U IP packets 1219 to/from MNO eNodeB, GTP-S5 U IP packets 1223 to/from MNO's PGW, and GTP-C S11 control packets 1221 to/from MNO's MME, which is similar to the interfaces 1011 and 1111 shown in FIGS. 10*a* and 11*a*. Interface 1209 can be used to process all IP packets from user equipments and content IP packets back to user equipments and can be communicatively coupled to an external router 1225 (e.g., commodity IP and border gateway protocol (BGP) router), which, in turn, can be communicatively coupled to content provider routers and/or servers 1215, 1217. Interface 1213 can be used to process user equipment IP packets to internet via MNO's PGW and can also be communicatively coupled to the external router 1225.

The external router 1225 can be communicatively coupled to the routers 1215, 1217 using a content offload network interface through which protocol neighbor sessions and offloaded content flows to/from user equipments can be transmitted. The router 1225 can include one or more processors that can perform IP route lookup and routing protocol processes (whereby UE network address translation range of routes can be determined by the router 1225). In particular, the router 1225 can be communicatively coupled with the routers/servers 1215, 1217 using specific IP routes (via the content offload network interface) and using default (e.g., 0/0) routes to MNO's PGW. The router 1225 can receive/transmit data from/to user equipments via interface 1209 of the system 1201.

Similar to FIGS. 10*a* and 11*a*, the GTP-U daemon 1205 and GTP-C S11 daemon 1203 can be communicatively coupled using a GTP TED synchronization API interface, which can be used for transmission of data for the purposes of performing encapsulation/de-encapsulation of data packets. The packets 1219 and 1223 can be received, via the interface 1211, and processed by the daemon 1205 encapsulation/de-encapsulation components. The control packets 1221 can be received by the daemon 1203 via the interface 1211.

FIG. 12*b* illustrates an exemplary process 1252 that can be performed by the system 1200 for routing of packets, according to some implementations of the current subject matter. The system 1200 can initially make a determination whether a GTP packet arrived on the "MNO facing" interface or an IP packet arrived on the "content facing" interface or if a UE IP packet destined for PGW arrived from an external router. If the GTP packet arrived on the MNO facing interface, the system 1200 can perform processing operations 1202-1212, 1226-1234. If IP packet arrived from an external router, operations 1220-1224 can be performed. If the IP packet arrived on the content facing interface, the system 1200 can perform processing operations 1236-1250.

Upon determination that a GTP packet has arrived on the MNO facing interface, at 1202, a determination can be made whether the GTP packet has been transmitted from mobile network operator's PGW, at 1204. If the GTP packet was transmitted from the mobile network operator's PGW, the system 1200 can access a state table to determine whether GTP TED associated with the GTP packet is stored in that table, at 1230. If so, the GTP packet can be forwarded to the determined eNodeB associated with the UE TEID using the MNO facing port 802, at 1232-1234.

If it is determined that the GTP TED of the GTP packet is not in the state table, at 1230, the GTP packet can be discarded, at 1228, and any further forwarding/transmission of the GTP packet can end. Similarly, if, at 1204, it is determined that the GTP packet is not from mobile network operator's PGW, and it is not transmitted from mobile network operator's eNodeB, at 1206, the GTP packet can also be discarded, at 1228, thereby ending further processing of the GTP packet.

If it is determined that the GTP packet is from mobile network operator's eNodeB, at 1206, a determination whether the GTP TEID corresponds to a source NAT entry can be made, at 1208. If a stored source NAT entry does not exist, the system 1200 can allocate a source NAT entry to the GTP packet's TED from a pool of entries, at 1210. Otherwise, if an entry already exists, the GTP packet can be de-encapsulated and a translation of the user equipment's source IP address can be performed by the system 1200, at 1212. Then, after translation, an IP packet can be provided to an external router via router-facing interface, as shown in FIG. 12*a*, at 1226.

If an UE IP packet destined for MNO's PGW was received from an external router interface, at 1220, system 1200 can perform a lookup of the source IP address associated with the packet in the user equipment NAT table, translate source address to original user equipment source IP address, and encapsulate it with known GTP TED and PGW destination information, at 1222. Then, the GTP packet can be forwarded to the determined PGW of the mobile network provider via MNO facing interface, at 1224.

If an IP packet is received on the content facing interface, at 1236, the system 1200 can perform a lookup of a table containing a user equipment source NAT ranges, at 1238. If the route associated with the received IP packet is not in the user equipment source address table, at 1240, the IP packet can be discarded, at 1242, and any further processing of the IP packet can be terminated. If the route is in the user equipment source address table, at 1240, the system 1200 can determine whether the packet's destination IP address is allocated to existing TED translation, at 1246. If not, the IP packet is discarded, at 1242. If it has been allocated, then the system 1200 can translate NAT-range destination IP address to user equipment destination address, encapsulate it with matching GTP TED, and set destination GTP IP address to target eNodeB, at 1248. At 1250, subsequent to the encapsulation, a GTP packet can be forwarded to the determined eNodeB using MNO facing interface.

Type 4 System

FIGS. 13*a* and 13*b* illustrate an exemplary system 1330 and a process 1300, respectively, for offloading/routing of packets, according to some implementations of the current subject matter. The system 1330 can be implemented where the LIPA appliance (e.g., LIPA appliance 406) can provide routing but without network address translation (NAT) functionalities. The system 1330 and process 1300 can be incorporated into/performed by any of the systems discussed above with regard to FIGS. 4-8.

Referring to FIG. 13*a*, the system 1330 can include a physical host computing system 1341, which can include (similar to FIG. 10*a*) a host kernel having a GTP-U daemon 1313, a GTP-C S11 daemon 1315, a routing protocol daemon 1317, and a kernel routing table 1319. The computing system 1341 can also include an interface 1 1321 and an interface 2 1323. Interface 1321 can be used for processing GTP-S1 U IP packets 1329 to/from MNO's eNodeBs and/or SGW, GTP-S5 U IP packets 1333 to/from MNO's PGW, and GTP-C S11 control packets 1331 to/from MNO's MME. Interface 1323 can be used to process offloaded content flows to/from user equipments and protocol neighbor sessions with content provider routers and/or servers 1325, 1327.

The GTP-U daemon 1313 can include components that can perform GTP encapsulation/de-encapsulation, determine UE TED states, and can include an integrated IP routing information base (RIB). The GTP-U daemon 1313 and GTP-C S11 daemon 1315 can be communicatively coupled using a GTP TED synchronization API interface, which can be used for transmission of data for the purposes of performing encapsulation/de-encapsulation of data packets. The packets 1329 and 1333 can be received, via the interface 1321 and kernel routing table 1319, and processed by the daemon 1313 encapsulation/de-encapsulation components. The control packets 1331 can be received by the daemon 1315 via the interface 1321 and kernel routing table 1319. The routing protocol daemon 1317 can push protocol RIB data to the GTP-U daemon 1313's RIB. The system 1330 differs from the system 1000 (shown in FIG. 10*a*) in that it does not provide network address translation functionalities.

FIG. 13*b* illustrates an exemplary process 1300 that can be performed by the system 1330 (as shown in FIG. 13*a*) for routing of packets, according to some implementations of the current subject matter. The system 1330 can initially make a determination whether a GTP packet arrived on the "MNO facing" interface or an IP packet arrived on the "content facing" interface. If the GTP packet arrived on the MNO facing interface, the system 1330 can perform processing operations 1302-1324. If the IP packet arrived on the content facing interface, the system 1330 can perform processing operations 1301-1309.

Upon determination that a GTP packet has arrived on the MNO facing interface, at 1302, a determination can be made whether the GTP packet has been transmitted from mobile network operator's PGW. If the GTP packet was transmitted from the mobile network operator's PGW, the system 1330 can perform functions of a typical serving gateway (SGW) and forward the GTP packet to eNodeB that has the particular TED of the GTP packet, at 1308. Then, the GTP packet can be forwarded to the determined eNodeB associated with the UE TED using the MNO facing interface, at 1310.

If, at 1304, it is determined that the GTP packet is not from mobile network operator's PGW, and it is not transmitted from mobile network operator's eNodeB, at 1306, the GTP packet can also be discarded, at 1312, thereby ending further processing of the GTP packet.

If it is determined that the GTP packet is from mobile network operator's eNodeB, at 1306, the system 1330 can determine whether the GTP packet contains an IP payload, at 1322. If not, the system 1330 perform functions of a typical serving gateway and forward the GTP packet to PGW that has the TED of the GTP packet, at 1322, and the GTP packet can be forwarded to the determined PGW using the MNO facing interface, at 1324.

If the GTP packet contains an IP payload, at 1320, the system 1330 can determine whether the encapsulated user equipment's IP packet destination IP address is in the offload routing table, at 1314. If not, the system 1330 can perform processing operations 1322-1324, discussed above. Otherwise, the GTP packet can be de-encapsulated, at 1316 and the user equipment's IP packet can be forwarded to the indicated next-hop via content facing interface, at 1318.

If an IP packet is received on the content facing interface, at 1301, the system 1330 can determine whether content IP packet's destination IP address is contained in a GTP session table or contained in a network address translation session table (similar to the tables discussed above), at 1303. In this implementation, the system 1330 can access the GTP state table to determine whether the destination IP from the offload sources matches a known UE PDN IP address. If so, the packet can be delivered to the correct UE by following similar process as if the system 1330 was performing a NAT process, as discussed herein. If not, the IP packet can be discarded, at 1305, and any further processing of the IP packet can be terminated. Otherwise, at 1307, the system 1330 can encapsulate content IP packet with GTP header and associated TED value for user equipment's destination address, at 1307. At 1309, subsequent to the encapsulation, a GTP packet can be forwarded to the determined eNodeB using MNO facing interface.

Type 5 System

FIGS. 14*a* and 14*b* illustrate exemplary system 1400 and process 1452, respectively, for offloading/routing of packets, according to some implementations of the current subject matter. The system 1400 can be used in implementations where the LIPA appliance (e.g., LIPA appliance 406) provides a separate external routing system provides IP routing functionalities but does not provide NAT functionalities. The system 1400 and process 1452 can be incorporated into/performed by any of the systems discussed above with regard to FIGS. 4-8.

Referring to FIG. 14*a*, the system 1400 can include a physical host computing system 1401, which can include a host kernel having a GTP-U daemon 1405 and a GTP-C S11 daemon 1403. The computing system 1401 can also include an interface 1 1411, an interface 2 1409, and an interface 3 1413. Interface 1411 can be used for processing GTP-S1 U IP packets 1419 to/from MNO eNodeB, GTP-S5 U IP packets 1423 to/from MNO's PGW, and GTP-C S11 control packets 1421 to/from MNO's MME. Interface 1409 can be used to process all IP packets from user equipments and content IP packets back to user equipments and can be communicatively coupled to an external router 1425 (e.g., commodity IP and BGP router), which, in turn, can be communicatively coupled to content provider routers and/or servers 1415, 1417. Interface 1413 can be used to process user equipment IP packets to internet via MNO's PGW and can also be communicatively coupled to the external router 1425.

The external router 1425 can be communicatively coupled to the routers 1415, 1417 using a content offload network interface through which protocol neighbor sessions and offloaded content flows to/from user equipments can be transmitted. The router 1425 can include one or more processors that can perform IP forwarding, network address translation, and routing protocol processes. In particular, the router 1425 can be communicatively coupled with the routers/servers 1415, 1417 using specific IP routes (via the content offload network interface) and using default (e.g., 0/0) routes to MNO's PGW. The router 1425 can receive/transmit data from/to user equipments via interface 1409 of the system 1401.

The GTP-U daemon 1405 can include components that can perform GTP encapsulation/de-encapsulation and determine UE TED and IP access point name (APN) states. The GTP-U daemon 1405 and GTP-C S11 daemon 1403 can be communicatively coupled using a GTP TED synchronization API interface, which can be used for transmission of data for the purposes of performing encapsulation/de-encapsulation of data packets. The packets 1419 and 1423 can be received, via the interface 1411, and processed by the daemon 1405 encapsulation/de-encapsulation components. The control packets 1421 can be received by the daemon 1403 via the interface 1411.

FIG. 14b illustrates an exemplary process 1452 that can be performed by the system 1400 for routing of packets, according to some implementations of the current subject matter. The system 1400 can initially make a determination whether a GTP packet arrived on the "MNO facing" interface or an IP packet arrived on the "content facing" interface or if a UE IP packet destined for PGW arrived from an external router. If the GTP packet arrived on the MNO facing interface, the system 1400 can perform processing operations 1402-1412, 1424-1434. If IP packet arrived from an external router, operations 1420-1424 can be performed. If the IP packet arrived on the content facing interface, the system 1400 can perform processing operations 1436-1450.

Upon determination that a GTP packet has arrived on the MNO facing interface, at 1402, a determination can be made whether the GTP packet has been transmitted from mobile network operator's PGW, at 1404. If the GTP packet was transmitted from the mobile network operator's PGW, the system 1400 can access a state table to determine whether GTP TED associated with the GTP packet is stored in that table, at 1430. If so, the GTP packet can be forwarded to the determined eNodeB associated with the UE TEID using the MNO facing port 802, at 1432-1434.

If it is determined that the GTP TED of the GTP packet is not in the state table, at 1430, the GTP packet can be discarded, at 1428, and any further forwarding/transmission of the GTP packet can end. Similarly, if, at 1404, it is determined that the GTP packet is not from mobile network operator's PGW, and it is not transmitted from mobile network operator's eNodeB, at 1406, the GTP packet can also be discarded, at 1428, thereby ending further processing of the GTP packet.

If it is determined that the GTP packet is from mobile network operator's eNodeB, at 1406, a determination whether the GTP tunnel contains payload IP information, at 1408. If so, the GTP packet can be de-encapsulated, at 1412. Then, after de-encapsulation, an IP packet can be transmitted to an external router (e.g., router 1425) via router-facing interface, as shown in FIG. 14a, at 1426. Otherwise, the GTP packet can be forwarded to the determined mobile network operator's PGW via MNO facing interface 1 1411, at 1424.

If an UE IP packet destined for MNO's PGW was received from an external router interface, at 1420, system 1400 can perform a lookup of the source IP address associated with the packet in the user equipment IP table (similar to the GTP tables discussed above) and encapsulate it with known GTP TED and PGW destination information, at 1422. Then, the GTP packet can be forwarded to the determined PGW of the mobile network provider via MNO facing interface 1 1411, at 1424.

If an IP packet (destined for the user equipment) is received on the content facing interface from an external router interface, at 1436, the system 1400 can perform a lookup of the user equipment IP table containing destination IP addresses, at 1438. If the route associated with the received IP packet is not in the user equipment IP table, at 1446, the IP packet can be discarded, at 1442, and any further processing of the IP packet can be terminated. If the route is in the user equipment IP table, at 1446, the system 1400 can encapsulate it with matching GTP TED and set destination GTP IP address to a target eNodeB, at 1448. At 1450, subsequent to the encapsulation, a GTP packet can be forwarded to the determined eNodeB using MNO facing interface 1 1411.

Figure 15:
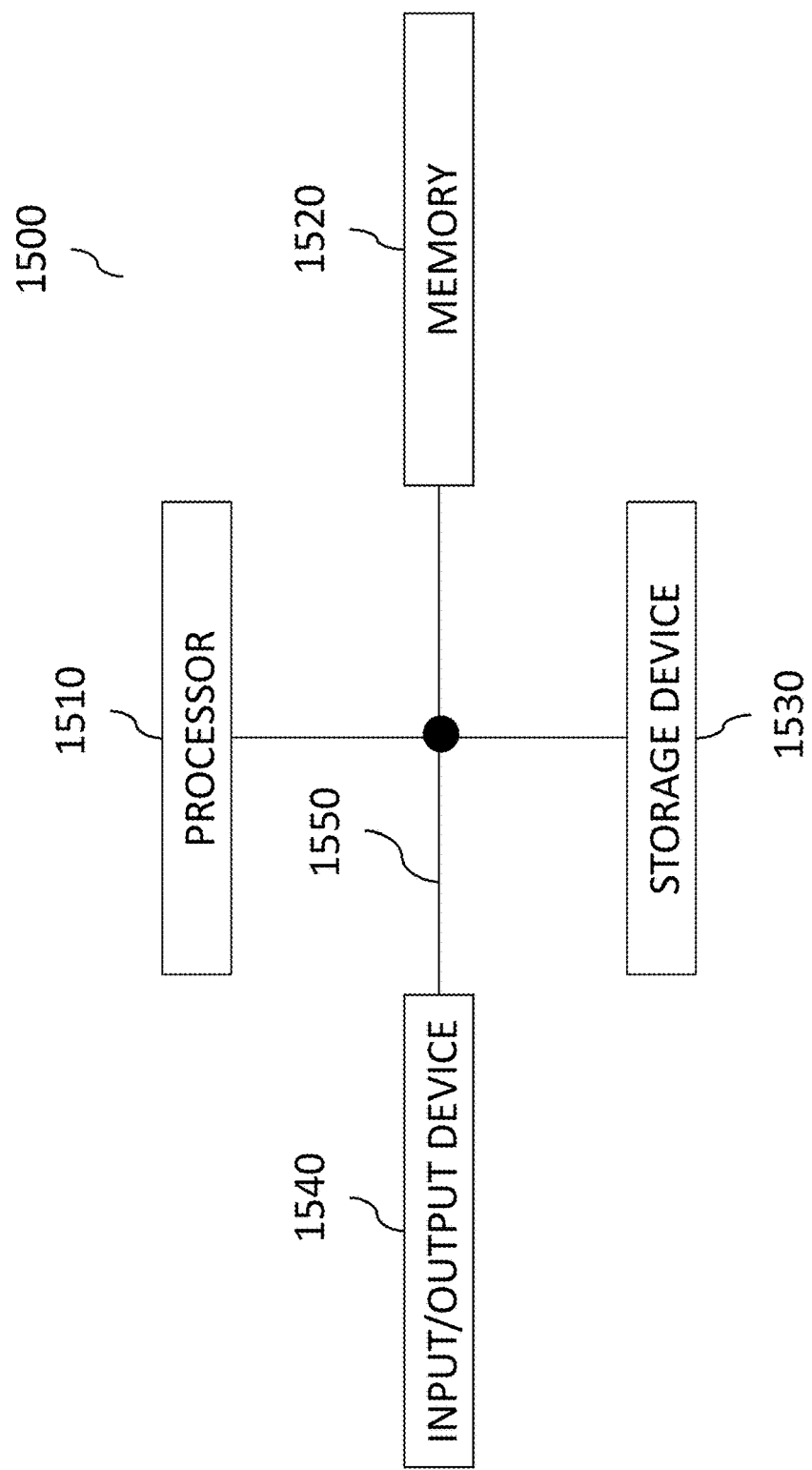
FIG. 15 illustrates an exemplary system, according to some implementations of the current subject matter.

In some implementations, the current subject matter can be configured to be implemented in a system 1500, as shown in FIG. 15. The system 1500 can include one or more of a processor 1510, a memory 1520, a storage device 1530, and an input/output device 1540. Each of the components 1510, 1520, 1530 and 1540 can be interconnected using a system bus 1550. The processor 1510 can be configured to process instructions for execution within the system 600. In some implementations, the processor 1510 can be a single-threaded processor. In alternate implementations, the processor 1510 can be a multi-threaded processor. The processor 1510 can be further configured to process instructions stored in the memory 1520 or on the storage device 1530, including receiving or sending information through the input/output device 1540. The memory 1520 can store information within the system 1500. In some implementations, the memory 1520 can be a computer-readable medium. In alternate implementations, the memory 1520 can be a volatile memory unit. In yet some implementations, the memory 1520 can be a non-volatile memory unit. The storage device 1530 can be capable of providing mass storage for the system 1500. In some implementations, the storage device 1530 can be a computer-readable medium. In alternate implementations, the storage device 1530 can be a floppy disk device, a hard disk device, an optical disk device, a tape device, non-volatile solid state memory, or any other type of storage device. The input/output device 1540 can be configured to provide input/output operations for the system 1500. In some implementations, the input/output device 1540 can include a keyboard and/or pointing device. In alternate implementations, the input/output device 1540 can include a display unit for displaying graphical user interfaces.

Figure 16:
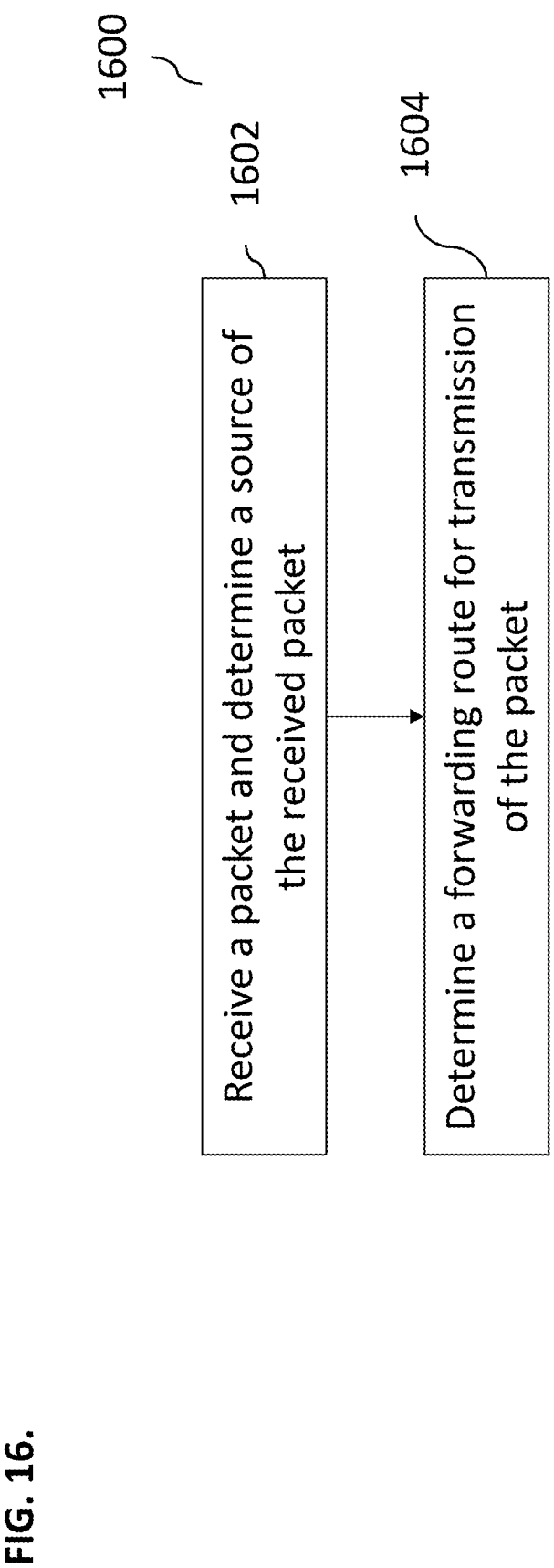
FIG. 16 illustrates an exemplary method, according to some implementations of the current subject matter.

FIG. 16 illustrates an exemplary method 1600 for routing of packets in a communications system, e.g., a long term evolution communications system, according to some implementations of the current subject matter. At 1602, a packet is received and a determination is made as to the source of the packet. At 1604, based on the determined source, a forwarding route for transmission of the packet can be determined, where the forwarding route includes at least one of the following: a known content route and a default content route.

In some implementations, the current subject matter can include one or more of the following optional features. The packet can be received by a local IP access appliance system that can be communicatively coupled to at least one component operated by a mobile network operator (e.g., eNodeB, Ethernet switch(es), backhaul network, evolved packet core (including SGW, PGW, PCRF, MME, etc.) and at least one content provider (e.g., content provider server(s)). The packet received by the local IP access appliance system can include at least one of: an IP packet received from the content provider and a GTP packet received from at least one component operated by the mobile network operator.

If the packet is a GTP packet received from an evolved packet core operated by the mobile network operator, the GTP packet is forwarded to an eNodeB operated by the mobile network operator. If the GTP packet is received from an eNodeB operated by the mobile network operator, at least one encapsulated IP packet (e.g., from a user equipment communicatively coupled to the eNodeB) contained in the GTP packet can be inspected and routed based on the determined encapsulated destination address of the IP packet. The routing includes a determination whether to route the packet along the known content route or the default content route. The GTP packet can be de-encapsulated and a network address translation can be performed if the determined destination address is the known content route, which causes the IP packet to be forwarded to the content provider. Otherwise, if the route is determined to be the default content route, the GTP packet is re-encapsulated and transmitted to the evolved packet core operated by the mobile network operator.

If the packet is an IP packet received from the content provider, the packet is transmitted to a user equipment communicatively coupled to an eNodeB operated by the mobile network operator. The transmission of the packet can performed using a GTP TED, which can be determined by the mobile network operator (i.e., MME of the evolved packet core operated by the mobile network operator).

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network (LAN), a wide area network (WAN), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    receiving a data packet;
    determining a source of the data packet and identifying a predetermined network address translation (NAT) range of addresses corresponding to the source of the data packet;
    determining, based on the source of the data packet and the identified predetermined NAT range of addresses, a forwarding route for transmission of the data packet, wherein the forwarding route includes at least one of the following: a known content route associated with one or more peering content providers and a default content route associated with one or more non-peering content providers; and
    transmitting the data packet based on the determined forwarding route.

2. The method according to claim 1, wherein the data packet is received by a local internet protocol (IP) access system communicatively coupled to at least one component operated by a mobile network operator and at least one content provider.

3. The method according to claim 2, wherein the data packet received by the local IP access appliance system can include at least one of the following: an IP packet received from the content provider and a general packet radio service tunneling protocol (GTP) packet received from the at least one component operated by the mobile network operator.

4. The method according to claim 2, wherein the at least one component operated by the mobile network operator includes at least one of the following: a base station, an eNodeB base station, an Ethernet switch, a backhaul network, an evolved packet core system and any combination thereof.

5. The method according to claim 3, wherein upon determination that the data packet is a GTP packet received from at least one component operated in the evolved packet core operated by the mobile network operator, further comprising
    transmitting the GTP packet to a base station operated by the mobile network operator.

6. The method according to claim 3, wherein upon determination that the data packet is a GTP packet received from a base station operated by the mobile network operator, further comprising:
    inspecting at least one encapsulated IP packet contained in the GTP packet to determine an encapsulated destination address of the at least one encapsulated IP packet;
    transmitting the at least one encapsulated IP packet using the determined encapsulated destination address of the IP packet.

7. The method according to claim 6, wherein the transmitting the at least one encapsulated IP packet includes
    determining whether to route the at least one encapsulated IP packet using at least one of the following: the known content route and the default content route.

8. The method according to claim 7, upon determining that the at least one encapsulated IP packet is to be transmitted using the known content route, further comprising
    de-encapsulating the GTP packet; and
    transmitting the at least one encapsulated IP packet to the at least one content provider.

9. The method according to claim 7, further comprising performing a network address translation of the destination address.

10. The method according to claim 7, upon determining that the at least one encapsulated IP packet is to be transmitted using the default content route, further comprising
    re-encapsulating the GTP packet; and
    transmitting the re-encapsulated GTP packet to the at least one component operated by the mobile network operator.

11. The method according to claim 3, wherein upon determination that the data packet is an IP packet received from the at least one content provider, further comprising
    transmitting the IP packet to a user equipment communicatively coupled to a base station operated by the mobile network operator.

12. The method according to claim 11, wherein the transmitting of the IP packet includes
    transmitting the IP packet using a GTP tunnel endpoint identifier (TED), wherein the GTP TED is determined by the mobile network operator.

13. A system comprising:
    at least one data processor;
    memory storing instructions which, when executed by the at least one data processor, causes the at least one data processor to perform operations comprising:
        receiving a data packet;
        determining a source of the data packet and identifying a predetermined network address translation (NAT) range of addresses corresponding to the source of the data packet;
        determining, based on the source of the data packet and the identified predetermined NAT range of addresses, a forwarding route for transmission of the data packet, wherein the forwarding route includes at least one of the following: a known content route associated with one or more peering content providers and a default content route associated with one or more non-peering content providers; and transmitting the data packet based on the determined forwarding route.

14. The system according to claim 13, wherein the data packet is received by a local internet protocol (IP) access system communicatively coupled to at least one component operated by a mobile network operator and at least one content provider.

15. The system according to claim 14, wherein the data packet received by the local IP access appliance system can include at least one of the following: an IP packet received from the content provider and a general packet radio service tunneling protocol (GTP) packet received from the at least one component operated by the mobile network operator.

16. The system according to claim 14, wherein the at least one component operated by the mobile network operator includes at least one of the following: a base station, an eNodeB base station, an Ethernet switch, a backhaul network, an evolved packet core system and any combination thereof.

17. The system according to claim 15, wherein upon determination that the data packet is a GTP packet received from at least one component operated in the evolved packet core operated by the mobile network operator, further comprising transmitting the GTP packet to a base station operated by the mobile network operator.

18. The system according to claim 15, wherein upon determination that the data packet is a GTP packet received from a base station operated by the mobile network operator, further comprising:

inspecting at least one encapsulated IP packet contained in the GTP packet to determine an encapsulated destination address of the at least one encapsulated IP packet;

transmitting the at least one encapsulated IP packet using the determined encapsulated destination address of the IP packet.

19. The system according to claim 18, wherein the transmitting the at least one encapsulated IP packet includes determining whether to route the at least one encapsulated IP packet using at least one of the following: the known content route and the default content route.

20. The system according to claim 19, upon determining that the at least one encapsulated IP packet is to be transmitted using the known content route, further comprising de-encapsulating the GTP packet; and transmitting the at least one encapsulated IP packet to the at least one content provider.

21. The system according to claim 19, wherein the operations further comprise performing a network address translation of the destination address.

22. The system according to claim 19, upon determining that the at least one encapsulated IP packet is to be transmitted using the default content route, further comprising re-encapsulating the GTP packet; and transmitting the re-encapsulated GTP packet to the at least one component operated by the mobile network operator.

23. The system according to claim 15, wherein upon determination that the data packet is an IP packet received from the at least one content provider, further comprising transmitting the IP packet to a user equipment communicatively coupled to a base station operated by the mobile network operator.

24. The system according to claim 23, wherein the transmitting of the IP packet includes transmitting the IP packet using a GTP tunnel endpoint identifier (TEID), wherein the GTP TEID is determined by the mobile network operator.

25. A non-transitory computer program product storing instructions, which when executed by at least one data processor of at least one computing system, implement a method comprising:

receiving a data packet;

determining a source of the data packet and identifying a predetermined network address translation (NAT) range of addresses corresponding to the source of the data packet;

determining, based on the source of the data packet and the identified predetermined NAT range of addresses, a forwarding route for transmission of the data packet, wherein the forwarding route includes at least one of the following: a known content route associated with one or more peering content providers and a default content route associated with one or more non-peering content providers; and transmitting the data packet based on the determined forwarding route.

26. The computer program product according to claim 25, wherein the data packet is received by a local internet protocol (IP) access system communicatively coupled to at least one component operated by a mobile network operator and at least one content provider.

27. The computer program product according to claim 26, wherein the data packet received by the local IP access appliance system can include at least one of the following: an IP packet received from the content provider and a general packet radio service tunneling protocol (GTP) packet received from the at least one component operated by the mobile network operator.

28. The computer program product according to claim 26, wherein the at least one component operated by the mobile network operator includes at least one of the following: a base station, an eNodeB base station, an Ethernet switch, a backhaul network, an evolved packet core system and any combination thereof.

29. The computer program product according to claim 26, wherein upon determination that the data packet is a GTP packet received from at least one component operated in the evolved packet core operated by the mobile network operator, further comprising transmitting the GTP packet to a base station operated by the mobile network operator.

30. The computer program product according to claim 27, wherein upon determination that the data packet is a GTP packet received from a base station operated by the mobile network operator, further comprising:

inspecting at least one encapsulated IP packet contained in the GTP packet to determine an encapsulated destination address of the at least one encapsulated IP packet;

transmitting the at least one encapsulated IP packet using the determined encapsulated destination address of the IP packet.

31. The computer program product according to claim 30, wherein the transmitting the at least one encapsulated IP packet includes determining whether to route the at least one encapsulated IP packet using at least one of the following: the known content route and the default content route.

32. The computer program product according to claim 31, upon determining that the at least one encapsulated IP packet is to be transmitted using the known content route, further comprising de-encapsulating the GTP packet; and transmitting the at least one encapsulated IP packet to the at least one content provider.

33. The computer program product according to claim 31, wherein the operations further comprise performing a network address translation of the destination address.

34. The computer program product according to claim 31, upon determining that the at least one encapsulated IP packet is to be transmitted using the default content route, further comprising re-encapsulating the GTP packet; and transmitting the re-encapsulated GTP packet to the at least one component operated by the mobile network operator.

35. The computer program product according to claim 27, wherein upon determination that the data packet is an IP packet received from the at least one content provider, further comprising transmitting the IP packet to a user equipment communicatively coupled to a base station operated by the mobile network operator.

36. The computer program product according to claim 35, wherein the transmitting of the IP packet includes transmitting the IP packet using a GTP tunnel endpoint identifier (TEID), wherein the GTP TEID is determined by the mobile network operator.

37. The method according to claim 1, wherein one or more peering content providers are configured to receive and store the predetermined NAT range of addresses, and one or more peering content providers are configured to generate a response to the transmitted data packet using the predetermined NAT range of addresses.

38. The method according to claim 1, wherein the forwarding route is determined based on a session state associated with a communication session between the source of the data packet and one or more base stations, the session state being determined based on an Internet protocol address of the source of the data packet and a GTP TEID or FTEID assigned to the communication session.

39. The system according to claim 13, wherein one or more peering content providers are configured to receive and store the predetermined NAT range of addresses, and one or more peering content providers are configured to generate a response to the transmitted data packet using the predetermined NAT range of addresses.

40. The system according to claim 13, wherein the forwarding route is determined based on a session state associated with a communication session between the source of the data packet and one or more base stations, the session state being determined based on an Internet protocol address of the source of the data packet and a GTP TEID or FTEID assigned to the communication session.

41. The computer program product according to claim 1, wherein one or more peering content providers are configured to receive and store the predetermined NAT range of addresses, and one or more peering content providers are configured to generate a response to the transmitted data packet using the predetermined NAT range of addresses.

42. The computer program product according to claim 1, wherein the forwarding route is determined based on a session state associated with a communication session between the source of the data packet and one or more base stations, the session state being determined based on an Internet protocol address of the source of the data packet and a GTP TEID or FTEID assigned to the communication session.

\* \* \* \* \*